(12) United States Patent
Staschik

(10) Patent No.: US 6,393,775 B1
(45) Date of Patent: May 28, 2002

(54) UTILITIES CONTAINER

(76) Inventor: Udo Ingmar Staschik, P.O. Box 1070, 319 Sixth St., Keewatin, Ontario (CA), P0X 1C0

( * ) Notice: Subject to any disclaimer, the term of this patent is extended or adjusted under 35 U.S.C. 154(b) by 0 days.

(21) Appl. No.: 09/301,384

(22) Filed: Apr. 23, 1999

Related U.S. Application Data

(60) Provisional application No. 60/082,874, filed on Apr. 24, 1998.

(51) Int. Cl.[7] .................................................. E04B 2/56
(52) U.S. Cl. ........................................ 52/79.1; 52/220.1
(58) Field of Search ..................... 52/79.1, 34, 220.1, 52/220.2, 220.3

(56) References Cited

U.S. PATENT DOCUMENTS

| | | |
|---|---|---|
| 3,694,973 A | 10/1972 | Unger |
| 3,906,686 A | 9/1975 | Dillon |
| 4,655,011 A | 4/1987 | Borges |
| 5,329,464 A | 7/1994 | Sumic et al. |
| 5,404,136 A | 4/1995 | Marsden |
| 5,537,339 A | 7/1996 | Naganuma et al. |
| 5,572,438 A | 11/1996 | Ehlers et al. |
| 5,590,495 A | 1/1997 | Bressler et al. |
| 5,675,194 A | 10/1997 | Domigan |
| 5,707,513 A | 1/1998 | Jowett et al. |
| 5,724,773 A | 3/1998 | Hall |

OTHER PUBLICATIONS

ASTM Publication Code No. P (PCN) 04–013240–38, Townshend et al.
J Envron. 26:86–95 (1995), Jowett et al.

*Primary Examiner*—Beth A. Stephan

(57) ABSTRACT

For houses and other buildings in remote locations, which are not serviced with mains (municipal) utilities, a module includes the electric generator, water supply, sewage disposal, etc facilities. The module and its utilities are constructed, assembled, and installed into a room-structure, in a factory, whereby the whole module can be tested prior to shipping. The physical and structural integration of the components and systems permits and enhances functional and operational integration of the systems. The module uses co-generation, heat exchangers, etc, for coordinating the hitherto-separate utility systems.

40 Claims, 11 Drawing Sheets

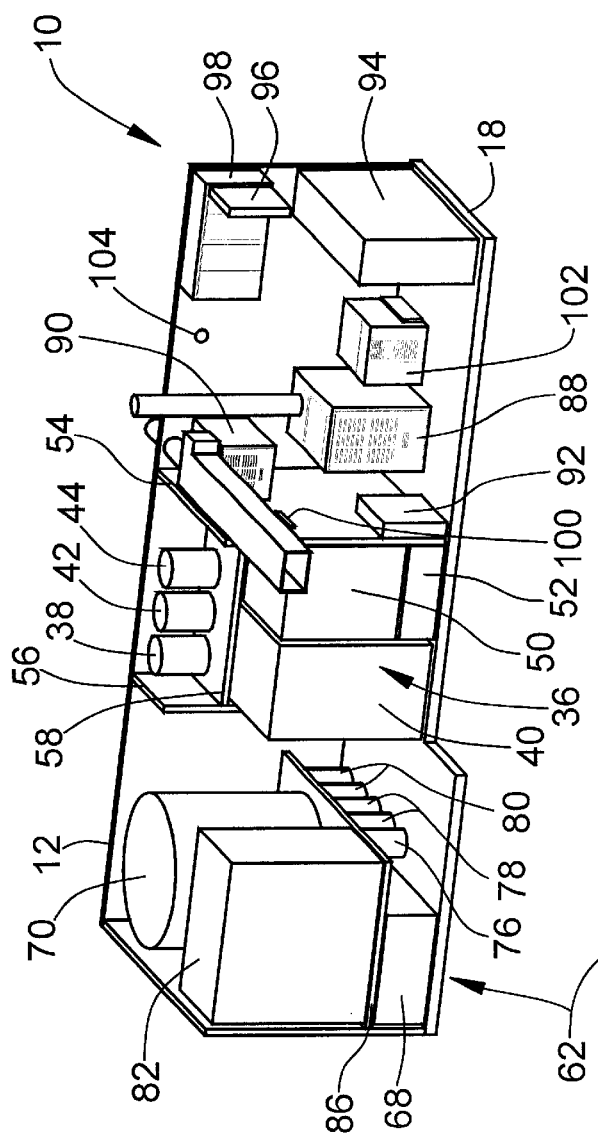
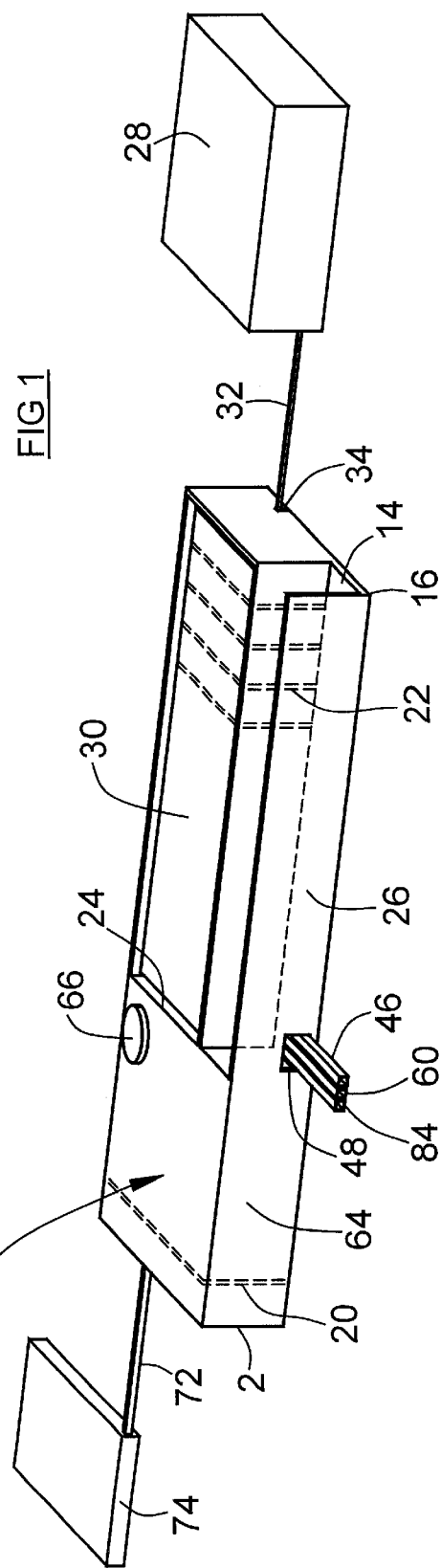
FIG 1

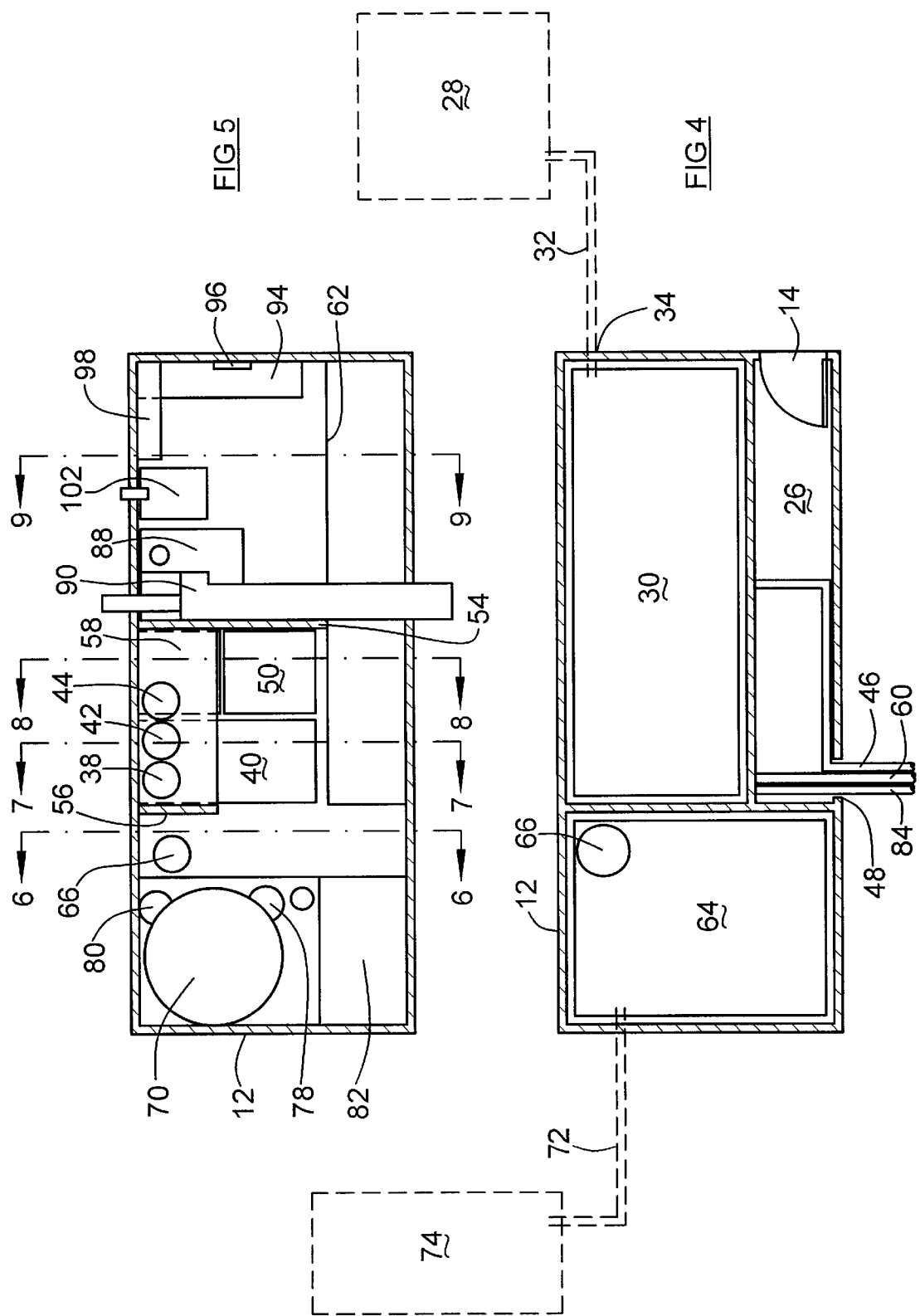

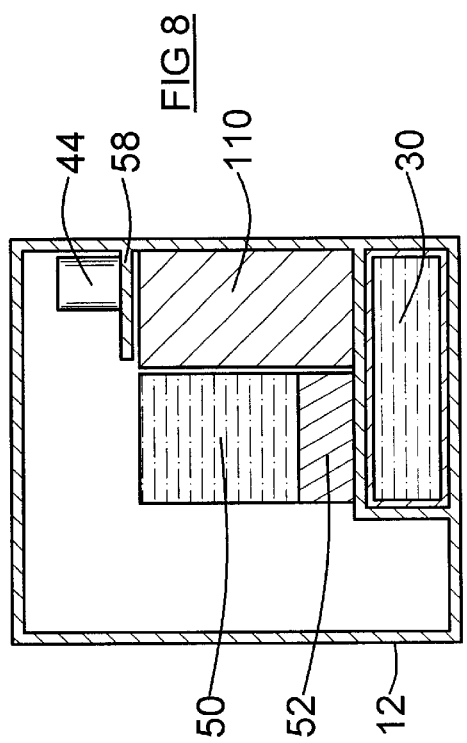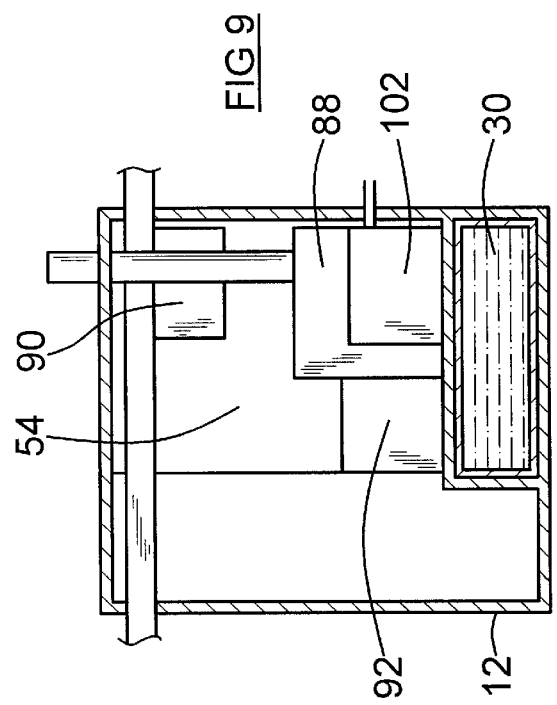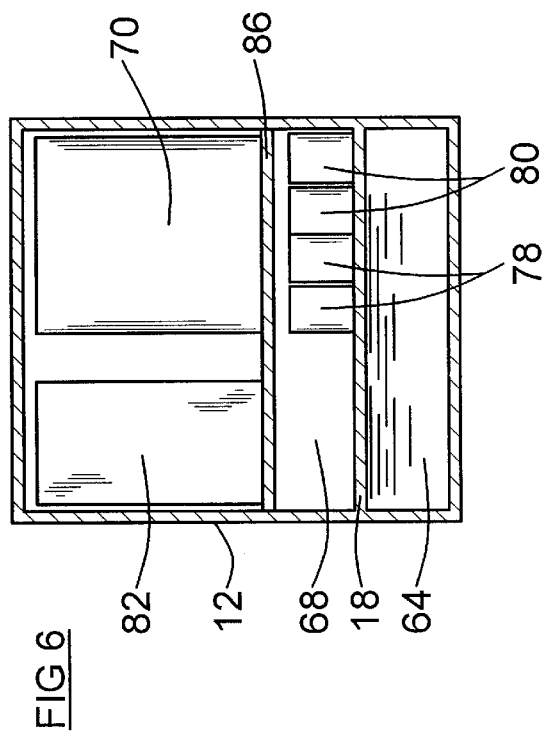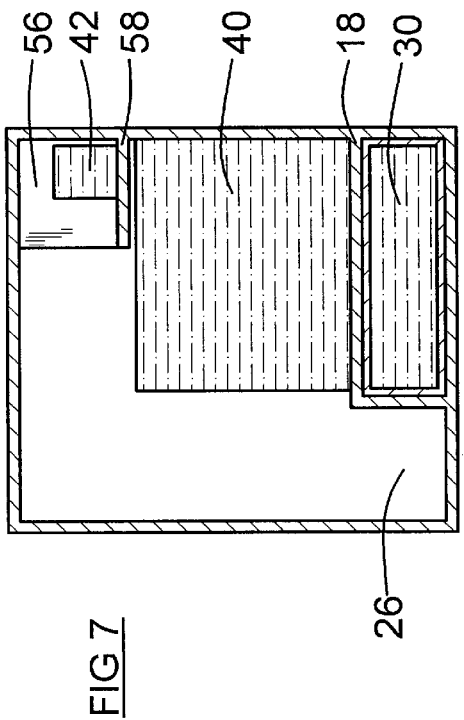

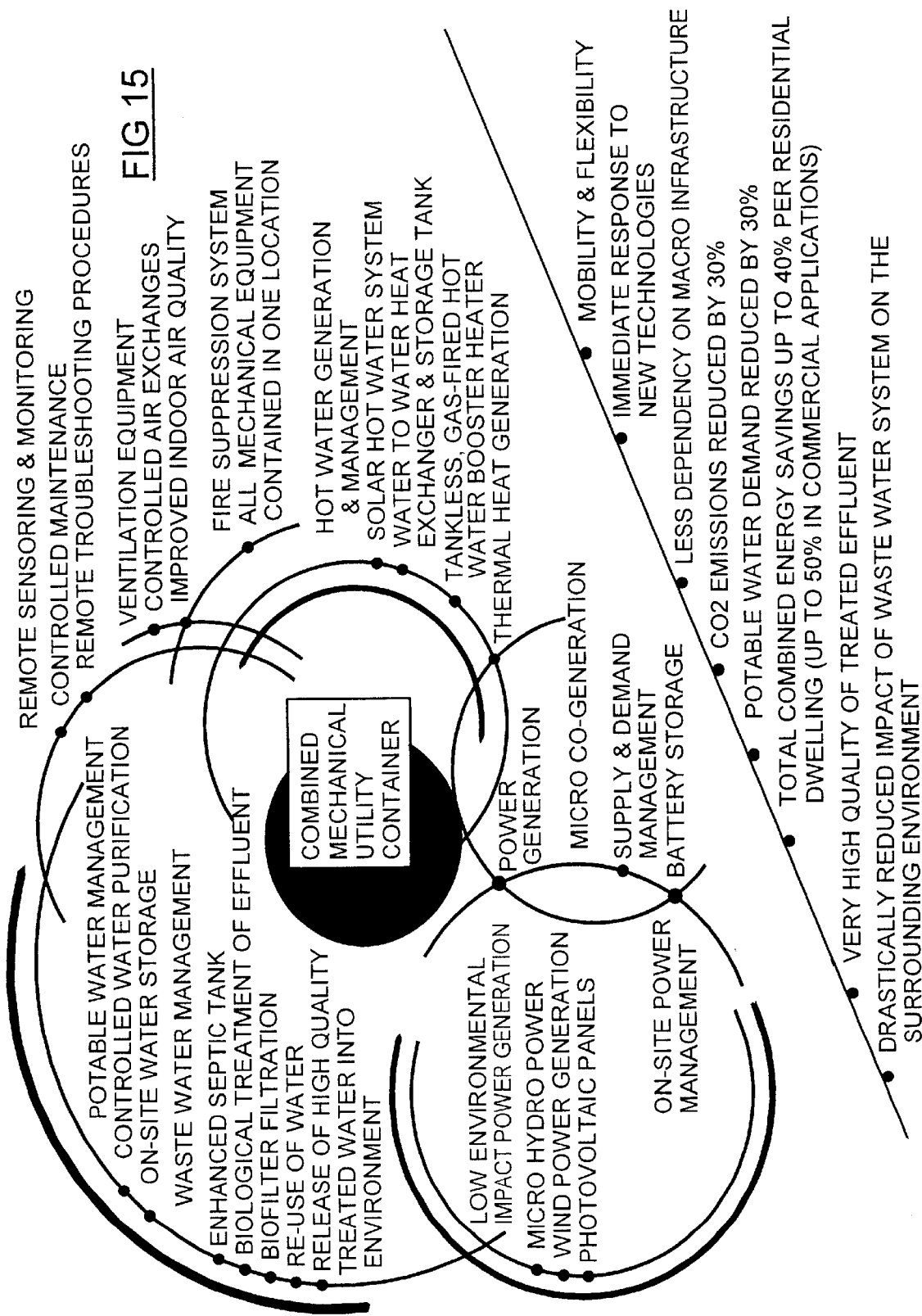

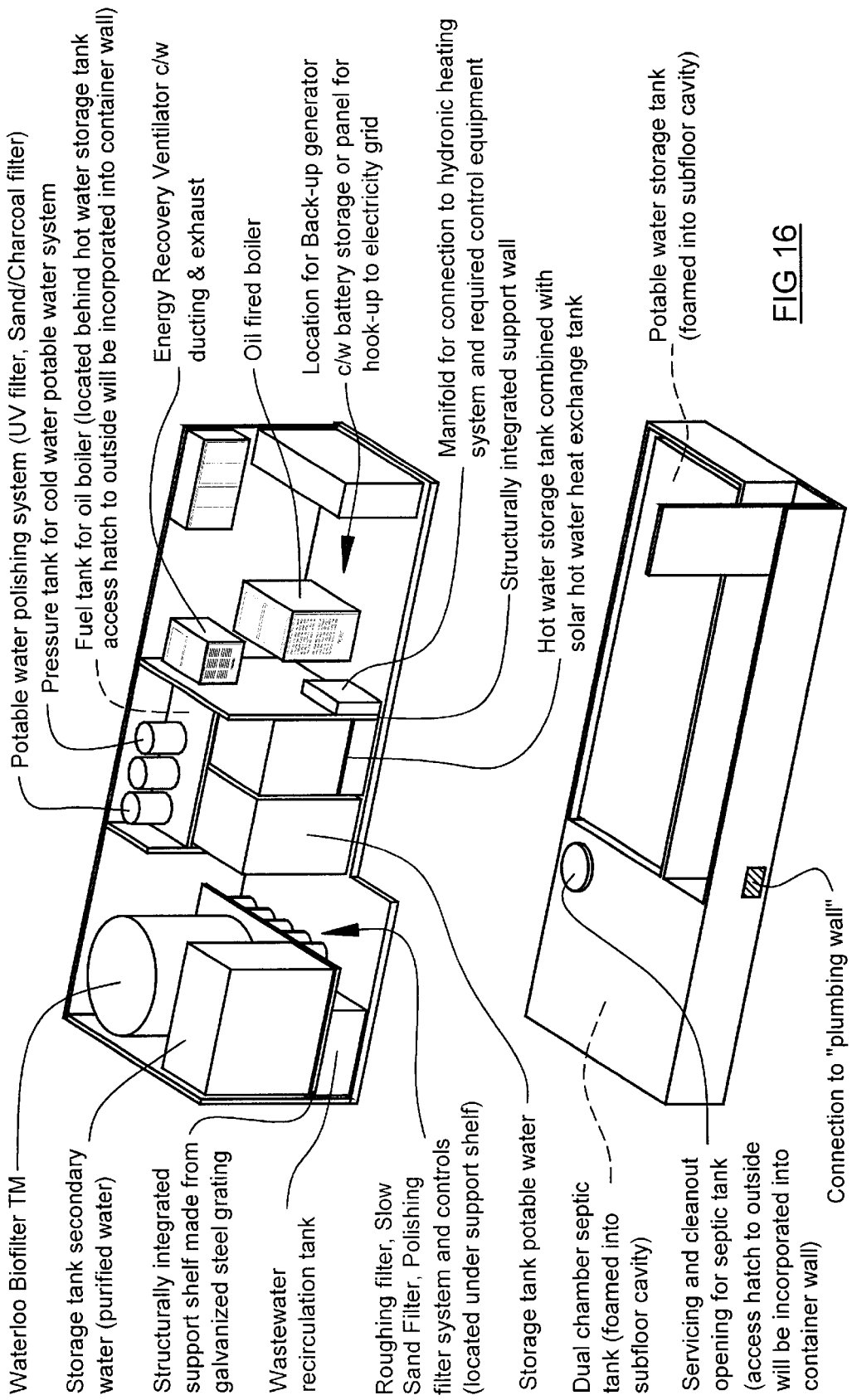

UTILITIES CONTAINER

This application claims benefit of application 60/082,874, filed Apr. 24, 1996.

This invention relates to the provision of utilities—water, electricity, sewage, etc—in places where there are no municipal mains. The invention is applicable for use with buildings in such places as: remote and rural areas; buildings in environmentally sensitive areas such as lakeshore and island locations; remote-location tourist accommodations; remote airports, weather stations, generating facilities etc; temporary mining, exploration, and construction camps; military deployment areas; and disaster-relief accommodations.

One of the main problems of buildings in remote locations, where there are no municipal mains, lies in the manner of providing the utilities, i.e water, electricity, sewage, etc, and the systems associated therewith, i.e hot water, space heating, etc. It has been the common practice for the architects and contractors of no-mains buildings to handle the supply of such things as diesel-generators, septic tanks, hot water heaters, and all the rest, in an uncoordinated way. The various structural units for supplying the facilities are all physically present in more or less the same place, but the components have all been selected, ordered, and delivered independently, and each item has had to be installed and tested on site.

As a result, the overall utility system, although it can be expected to operate, and the components can be expected to have a reasonable service life, still the system is a make-the-best-of-it aggregate of units, rather than a planned, purposeful integration of units. The designs as described herein, by contrast, permit the whole system to be planned not only as to the functional interaction between the various components, to promote operational efficiency, but planned as to the physical layout of the units and components, to minimize interference and to maximize beneficial interactions. In the described designs, the components can be assembled, in-factory, and the whole system can be tested, in-factory, as an integrated system.

The factory-assembled and tested module can be shipped and installed in the as-tested format. Once at the site, it is a simple matter to couple up the various plumbing and other connections to the building. The structures of the units and components are physically secured in the module, to the extent that the structures car remain secure during transport by road or rail (or by boat, if that is what is available).

In the described designs, i is not that the units and components are new in themselves: rather, the distinctiveness lies in the fact that the units and components can be assembled and secured into the module, in-factory, prior to shipping.

It is also recognised that the physical proximity and structural integration of the units provides an excellent basis on which to build functional and operational coordination of the units.

The described designs are of a module that allows a dwelling to operate independently of conventional municipal service connections. The module provides a removable/portable water, sewage, and electrical infrastructure, which need be tied neither to a specific dwelling nor to a specific site location. The module can be independent of the dwelling unit and can be pre-fabricated in a controlled factory-type environment.

The module may contain all, or some, of the following systems:

potable water purification and storage system;

biological purifier systems for waste water treatment;

grey-water circulation equipment;

water storage tanks, water-to-water heat exchanger and pressure systems;

central heating equipment;

stand-alone electricity system based on photovoltaic components, wind generator, with diesel-powered co-generation back-up system.

Sometimes, one of the utility services might be available from the municipal mains at a location. For example, it can sometimes be a fairly simple matter to bring mains electricity to an island, whereas it might be difficult to bring mains potable water, and impossible to bring a mains sewage connection, to the same site. The design as described herein can still be applicable, but its advantageous usefulness in that case is of course reduced, particularly in that advantage cannot now be taken of the interactability of the utility services that is enabled in the designs as described herein.

Although the invention is described and referred to specifically as it relates to specific devices and structures to accommodate systems and components for water treatment, water storage, wastewater treatment, wastewater storage and storage of treated wastewater and structures containing systems and components for water treatment, water storage, wastewater treatment, wastewater storage and storage of treated wastewater, it will be understood that the principles of this invention are equally applicable to similar devices, structures to contain and containing similar systems and components and accordingly, it will be understood that the invention is not limited to such devices, structures to contain and containing systems and components for Water treatment, water storage, wastewater treatment, wastewater storage and storage of treated wastewater.

Water and wastewater storage and treatment are generally carried out on a large municipal scale, Exceptions are largely rural or remote with individual filters to treat wellwater and the like, and individual septic tanks to treat wastewater, which operate in isolation. Generally there is no integrated system with recycling to handle both. Where such a system has been designed it has to be specifically designed and built into and around a dwelling or other building. There is a need for an integrated and integral system with recycling for easy installation or removable attachment from a dwelling or other building.

A specific system is described in ASTM Publication Code Number (PCN) 04-013240-38, Townshend et al. The system described therein is built into the entire dwelling, not removable from it and its components are not together in one place.

In a preferred version of the present design precipitation collects into a large cistern and passes after suitable sequential filtration through multi-media gravel, slow sand, activated carbon, and ultraviolet disinfection into a pressurized potable water storage tank which supplies drinking, washing and cooking water to kitchen and bathroom sinks. The wastewater then passes through a two chamber septic tank and an effluent filter into a recirculation tank, and then into a Waterloo Biofilter™ using a specific foam medium, which optimizes microbial wastewater degradation. The outflow of the Waterloo Biofilter™ is mostly into the recirculation tank, some is diverted to a, disposal bed, some passes into another sequential filtration or 'polishing, system of multi-media rough sand, slow sand, activated carbon, then ultraviolet or ozone disinfection. Ozone was found better in some ways. Both may be used together first ozone then ultraviolet. The treated water (grey water) is used for laundry, bath tub, showers, toilets, and like uses is probably potable, and meets health standards for swimming or bathing water.

The Waterloo Biofilter™ mentioned above is described in U.S. Pat. No. 5,707,513 issued to Jowett et al., Jan. 13, 1998, which teaches using 1.5 cm foam plastic (polyurethane) cubes (from Jowett et al., J. Environ. Qual. 24:86–95 (1995) which are better than shredded foam plastic). Other effective biofiltering media are commercially available and may be used instead.

It is a principal object of the invention to provide a structural container to hold a wastewater treatment system. It is a principal object of the invention to provide e, structural container to hold a water treatment system. It is a further principal object of the invention to provide a structural container holding wastewater and water treatment systems. It is a further principal object of the invention to provide a structural container to hold wastewater storage means. It is a further principal object of the invention to provide a structural container to hold water storage means. It is a further principal object of the invention to provide a structural container to hold wastewater and water storage means. It is a principal object of the invention to provide a structural container to hold wastewater treatment systems and storage. It is a principal object of the invention to provide a structural container to hold water treatment systems and storage. It is a further principal object of the invention to provide a structural container holding water and wastewater treatment systems and storage means. It is a subsidiary object to provide a container having space heating means. It is a subsidiary object to provide a container having water heating means. It is a subsidiary object to provide a container having air conditioning means. It is a subsidiary object to provide a container having means for energy or heat recovery from ventilated air. It is a subsidiary object to provide a container having a remote monitoring and control system for water and/or wastewater treatment. It is a subsidiary object to provide a container having a grey water sprinkler system. Other objects will be apparent to those skilled in the art from the following specification, statement of invention claimed and accompanying drawings.

In one broad aspect the invention is directed to a container for water and wastewater treatment systems with four upright walls forming a rectangular enclosure. The enclosure has a base floor frame attached to the base of the walls supporting a load bearing floor, and a roof/ceiling attached to the top of the walls. The container has external height not more than 8 feet, external length not more than 20 feet, and external width not more than 8 feet 2 inches, thus being the same size as a cargo container at largest. It can be as little as 6 feet 6 inches long. The enclosure has an opening for human access and a plurality of wall openings to allow water and electric power supply conduits to pass therethrough. Preferably the enclosure has a wall subfloor frame attached to the upright walls above and spaced apart from the base floor frame, which supports a load bearing subfloor spaced above and apart from the floor. The subfloor is preferably supported by upper subfloor longitudinal edge beams above lower floor longitudinal beams with supporting bends, or bays or frames transverse to and connecting the beams. The frames have upper subfloor joists connecting the upper beams, lower floor joists connecting the lower floor beams, upright studs connecting each upper subfloor beam to the lower floor beam below it. Preferably there is at least one tank means in the space between floor and subfloor. If so it is desirably surrounded by foamed material to hold it in the space between floor and subfloor. Preferably it is a dual chamber septic tank, when conveniently a section of container wall adjacent the septic tank is removable to allow removal of the septic tank. Sometimes tank means for water storage is in the space between floor and subfloor. Usually the septic tank has a clean out opening, and the container wall has an access hatch to access the septic tank clean out opening. Often a support shelf is built into one or more walls of the container above the septic tank. Usually to provide strength against torque a lower transverse support wall is provided between opposed container walls and the floor and subfloor abutting the septic tank on one side. Also an upper transverse support wall extending from the subfloor to the roof/ceiling of the container is provided for similar reasons. Generally further wall openings are provided for chimneys, ducts, ventilation pipes for heating and/or air conditioning, and filling pipes. These openings are sealed by self sealing means to provide a sealed environment within the container.

In another broad aspect the invention is directed to a water treatment system within a container comprising inlet water conduit means passing through a wall of the container, water filter means comprising first water filter means to remove particulate matter and turbidity and second water filter means to remove big-organisms, and a pressurized storage tank means, water conduit means connecting the water filter means and the pressurized storage tank means, and outlet water conduit means passing through a wall of the container, the inlet water conduit means being couplable to water supply conduit means, the outlet water conduit means being couplable to building water supply inlet conduit means. Usually at least one water storage tank means distinct from the pressurized storage tank means is provided, generally a cold water storage tank means, often a hot water storage tank means with associated water heating means.

In a further broad aspect the invention is directed to a wastewater treatment system within a container comprising an inlet wastewater conduit means passing through a wall of the container, leading to a dual chamber septic tank, the septic-tank having effluent conduit means leading to a single pass aerobic biological filtration column to remove big-organisms, a conduit means leading from the biological filtration column to wastewater filter means, which has first wastewater filter means to remove particulate matter and turbidity, and second wastewater filter means to remove residual bio-organisms downstream of said first wastewater filter means, outlet leachfield wastewater conduit means upstream of the first wastewater filter means, passing through a wall of the container, grey water storage tank means, downstream of the first wastewater filter means, outlet grey water conduit means, passing through a wall of the container, downstream of the grey water storage tank means, the inlet wastewater being couplable to building wastewater outlet conduit means, the outlet leachfield conduit means being couplable to inlet wastewater conduit means for leachfield means, the grey water outlet means being couplable to building great water supply inlet conduit means. Usually a wastewater recirculation tank means is provided downstream of the septic tank and upstream of the biological filtration column, with recirculation wastewater conduit means downstream of the biological filtration column leading to the wastewater recirculation tank means. Desirably a water treatment system is provided within the container comprising inlet water conduit means passing through a wall of the container, water filter means comprising first water filter means to remove particulate matter and turbidity and second water filter means to remove bio-organisms, and a pressurized storage tank means, water conduit means connecting the water filter means and the pressurized storage tank means, and outlet water conduit means passing through a wall of the container, the inlet water conduit means being couplable to water supply conduit means, the outlet water conduit means being couplable to building water supply inlet conduit means, the treated water from the water treatment system when used becoming the wastewater for the wastewater treatment system. Usually at least one water storage tank means distinct from the pressurized storage tank means is provided, generally a cold water storage tank means, often a hot water storage tank means with associated water heating means.

In a further broad aspect the invention is directed a container for wastewater treatment systems comprising four upright walls forming a rectangular enclosure, the enclosure having a base floor frame attached to the base of the walls supporting a load bearing floor, and a roof/ceiling attached to the top of the walls, the container having external height not more than 8 feet, external length not more than 20 feet, and external width not more than 8 feet 2 inches. The enclosure has an opening for human access and a plurality of wall openings to allow water and electric power supply conduits to pass therethrough. The enclosure further has a wall subfloor frame attached to the upright walls above and spaced apart from the base floor frame, the subfloor frame supports a load bearing subfloor spaced above and apart from the floor. The subfloor is supported by upper subfloor longitudinal edge beams above lower floor longitudinal beams with supporting bends, or bays or frames transverse to and connecting the beams, the frames having upper subfloor joists connecting the upper beams, lower floor joists connecting the lower floor beams, upright studs connecting each upper subfloor beam to the lower floor beam below it. A dual chamber septic tank surrounded by foamed material is in the space between subfloor and floor abutting one endwall of the container. Above the septic tank adjacent the same end wall resting on the subfloor is a wastewater recirculation tank means and a wastewater polishing system comprising particulate matter filter means and big-organism filter means. Above the wastewater recirculation tank means and wastewater polishing system is a support shelf built into one or more walls of the container on which shelf rest a wastewater biofiltration column and a grey water storage tank means. The septic tank, wastewater recirculation tank means, wastewater biofiltration column, wastewater polishing system and grey water storage tank means are connected by conduits for liquid. Preferably a transverse lower support wall extends between opposed container walls and the floor and subfloor abutting the septic tank. Preferably the container comprising a potable water treatment system, which comprises a potable water storage tank means resting on the subfloor, and resting on a potable water upper support shelf is a potable water polishing system comprising particulate matter filter means and big-organism filter means and a pressurized potable water storage tank means. The potable support shelf is supported by opposed spaced apart upper support walls projecting from a sidewall of the container above the subfloor. Suitably the potable water storage means include cold and hot tank means having associated heating means resting on the subfloor between said upper support walls. The associated heating means may be solar powered.

Preferably an access corridor extends along one side of the container from the transverse lower support wall to the endwall of the container remote from the septic: tank and the subfloor and supporting bends, bays or frames extend from the sidewall of the container remote from the access corridor to the near edge of the access corridor. The upper support wall remote from the septic tank may extend from container sidewall to near edge of access corridor and from subfloor to roof/ceiling and is a firewall. Often a space heating furnace with associated ducting for ventilation and heating couplable to those of a building is mounted on said subfloor on the side of the firewall remote from the septic tank. Air conditioning means may be associated with the ducting, as may be ERV or HRV. When the furnace is an oil furnace, an oil tank therefor is provided resting on the subfloor between the firewall and the other upper support wall, with filling access means through the adjacent container sidewall. Electric power supply means may be present in the container on the same side of the firewall as the furnace. Typically the electric power supply means is selected from solar (photovoltaic), local grid, storage battery, and generator. Monitoring means for wastewater treatment means, water treatment means, space heating furnace and electric power supply, when these are present, may be mounted in the container on the same side of the firewall as the furnace. Conveniently the monitoring means; has remote dial-up access means incorporated therein. Sometimes a potable water storage cistern surrounded by foamed material fills the space under the subfloor between the transverse lower support wall and the endwall of the container remote from the septic tank.

BRIEF DESCRIPTION OF THE DRAWINGS

FIG. 1 is a part perspective, part sectional, part cut away, part exploded view of an embodiment of the invention.

FIG. 4 shows a horizontal cross section of the lower portion of the embodiment of FIG. 1.

FIG. 5 shows a horizontal cross section of the lower portion of the embodiment of FIG. 1.

FIGS. 6 to 9 are vertical cross sections of the embodiment of FIG. 1.

FIG. 15 is a diagrammatic showing of the manner in which various utility systems can be accommodated on, and coordinated into, a utilities module.

FIG. 16 is a pictorial view of another utilities module that embodies the invention.

Figure 3:
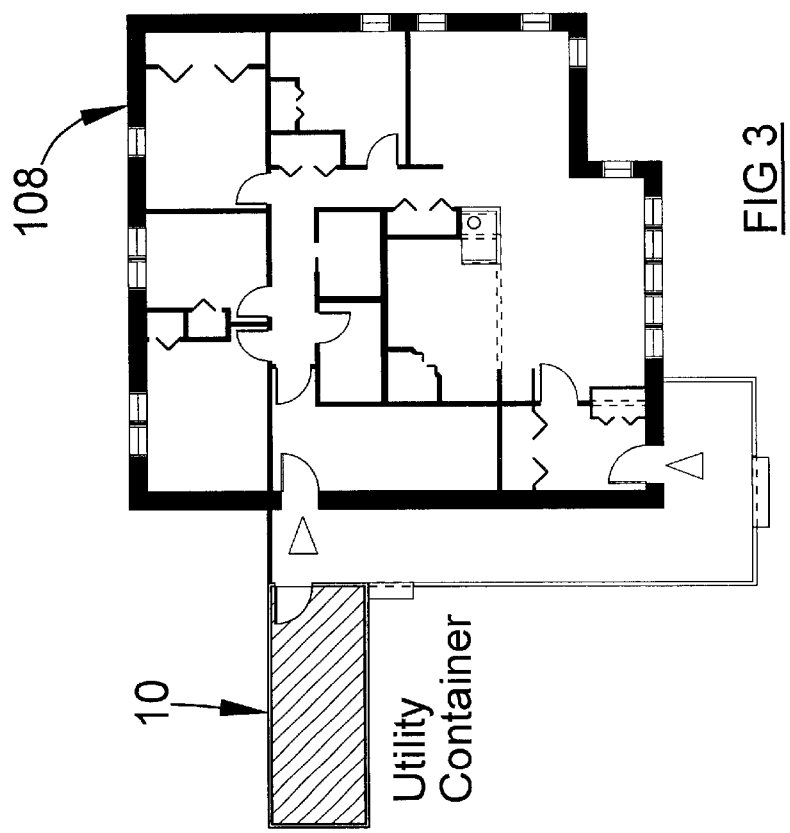
FIG. 3 shows a part sectional top view of another building including an embodiment of FIG. 1.

The invention is now illustrated by reference to preferred embodiments thereof. Numeral 10 indicates the combined mechanical utility container of the invention, which has rigid box, shell or enclosure 12 having access doorway 14 and a plurality of openings (not all shown) for connection of external components to internal systems and storage means. Doorway 14 can be replaced by a roof/ceiling or wall access hatch. Container 10 a rigid box, shell, or enclosure, is fabricated from suitable conventional non-combustible structural building material for external use, as would be known by those skilled in the art. It has external width of 8 feet 2 inches, external height of 8 feet, and length from 12 to 20 feet. Its cross section is identical to that of a standard shipping container, and in fact the system can be built in a standard shipping container. Two can be transported together by road as a semitrailer load, one together with its internal load (without water) weighs 10,000–20,000 lbs can be moved using a forklift, although by suitable attachments other forms of lifting may be used, such as cranes, loaders, back-hoes, cherry-pickers (bucket-loaders) and the like. Its walls are typically four inches thick including cladding leaving an internal width of 7 feet 6 inches. Apart from the access door only apertures for five water conduits are needed for potable water entry and exit, grey water entry and exit, and excess grey water discharge. A power inlet and possibly air duct(s) for heating and air conditioning are also needed. None of which are beyond the skill of trained workmen. Besides walls and roof (not shown) enclosure 10 has loadbearing floor 16 and raised about 2 feet above this loadbearing subfloor 18. Additional strength is provided by longitudinal beams and transverse bends or bays 20 and 22 formed by paired upright studs linking paired horizontal joists, the lower beams and joists support the floor, while the upper support the subfloor. A lower transverse support wall 24 between water treatment and storage and furnace provides additional strength. Corridor 26 allows access for normal sized human beings from doorway 14. The strengthening of the container is necessary because most commercially available economically priced components while capable of holding liquid water are not otherwise designed to bear loads. The length variation of the enclosure as required by specific site conditions is achieved by varying the number of structural bends, in this case 12, 16 or 24 inch bends.

Untreated water is stored in optional external frost protected 22,000 liter (5812 U.S. gallon) potable water storage cistern 28, conveniently underground, or internal potable storage cistern 30, usually only one is present. Internal potable water cistern 30 is 2×5½×5½ to 13½ feet having a capacity from about 1700 to about 4200 liters, depending on enclosure length. Internal cistern 30 may be present when trucked water is supplied. External cistern 28 is supplied by suitable freshwater, for example rainwater, meltwater, wellwater, springwater, riverwater, lakewater, trucked water and the like, While it makes no sense in the context of the invention to supply cisterns 28 and 30 from a treated municipal water supply, it is possible to do so. Conduit 32 brings water from external cistern 28 into enclosure 10 through aperture 34. Water from cistern 28 or 30 is then passed through potable water treatment system 36. First it passes through filter 38 which removes turbidity and particulate matter. Filter 38 malt be a sequential multi-media filter of gravel (or rough sand), slow sand and activated charcoal, as those skilled in the art realize other conventional filters of like effect may be used, such as membrane filters. The filtered water from filter 38 then goes to 250 gallon (300 U.S.) potable cold water storage tank 40. The potable water is then passed through filter 42, to remove big-organisms and other living matter, which maybe be a W filter, other conventional filters of like effect, such as ozone, ionized resin, and reverse osmosis filters, as would be known to those skilled in the art, may be used for the same purpose instead. Filters 38 and 42 may be integrated together into a single pass system, such as commercially available combined ozonation device with filter. From filter 42 water passes into pressurized potable water storage tank 44, whence is flows through potable water conduit 46 to the potable water system of the building, where it is used for drinking, washing and cooking water in kitchen and bathroom sinks. Conveniently opening 48 carries several water conduits. Hot potable water tank 50 may be supplied either directly from filter 42 or from pressurized water storage tank 44. Hot potable water tank SO is heated by solar hot water-heat exchanger tank 52. Potable water treatment system 36 is contained between lateral support walls 54 and 56, which support shelf 58, on which are filters 38 and 42, and pressurized storage tank 44.

The sequence of filters 38 and 42, and storage tanks 40 and 44 is generally as described, the order of filters is as described, but their location can vary with respect to storage tanks, as those skilled in the art would realize.

After use potable water along with other wastewater returns via wastewater conduit 60 to wastewater treatment system 62, which is physically apart and separate from water treatment system 36, being separated by subfloor 18 and lateral wall 56. The wastewater flows into 500 gallon (600 us) dual chamber septic tank 64 with cleanout, opening 66, the septic tank has a height desirably less than a meter, preferably less than ¾ meter, conveniently 2 feet. An external opening in enclosure 10 (not shown) allows access to septic tank cleanout 66. Wastewater from septic tank 64 is pumped into recirculation tank 68, which provides an anoxic mixing zone for nitrogen removal by denitrification. From tank 68 it proceeds to biofilter 70. The treated water from biofilter 70 is split into three streams the bulk is recycled to recirculation tank 68, while the rest is fed either to underground leachfield disposal bed 74 via wastewater conduit: 72, or to polishing system 76. First it passes through filter 78 which removes turbidity and particulate matter. Filter 78 may be a sequential multi-media filter of gravel (or rough sand), slow sand and activated charcoal, as those skilled in the art realize other conventional filters of like effect may be used, such as membrane filters. The filtered water from filter 78 is then passed through filter 80, to remove big-organisms and other living matter, which maybe be an ozone filter, other conventional filters of like effect, such as UV, ionized resin, and reverse osmosis filters, as would be known to those skilled in the art, may be used for the same purpose instead. Filters 78 and 80 may be integrated together into a single pass system, such as commercially available combined ozonation device with filter. After filter 80 the treated water goes to grey water storage tank 82 and thence to secondary (grey) water conduit 84 to grey water system of the building for laundry, bath tub, showers and toilets and any other outlets such as garden hose, sprinkler systems, etc. Wastewater from these passes back into septic tank 64, by wastewater conduit 60. The water volume in wastewater treatment system 62, including septic tank 64, biofilter 70, polishing system 76 and tanks 68 and 82 is maintained constant, as additional water enters as wastewater from potable water system, excess volume is passed out to disposal bed 74. Structural support shelf 86 a strong fibreglass-reinforced-plastic or metal grating 1½ inches thick with openings 1½×1½ inches supports grey water storage tank 82 and biofilter 70 above wastewater recirculation tank 68. Grey water storage tank 82 is approximately 4×4×25 feet (about 2250 liters), biofilter 70 is 4 feet tall by 4 feet in diameter (about 1400 liters), wastewater recirculation tank 68 is about 1×3×7 feet (about 1000 liters), septic tank 64 is about 2×6×7 feet (about 2550 liters). The filters in polishing system 76 may be varied in location and particulate filter 78 is generally upstream of storage tank 82, while the biorganism filter 80 is generally downstream, but this can be varied. The only restriction, which is economic and practical, is that water passing back into recirculation tank 68 and out to leachfield 74 is not passed through these filters. Due to recirculation and grey water re-use leachfield 74 requires substantially less capacity and consequently can be installed with much less environmental intrusion and considerably less cost than a conventional septic field.

Figure 2:
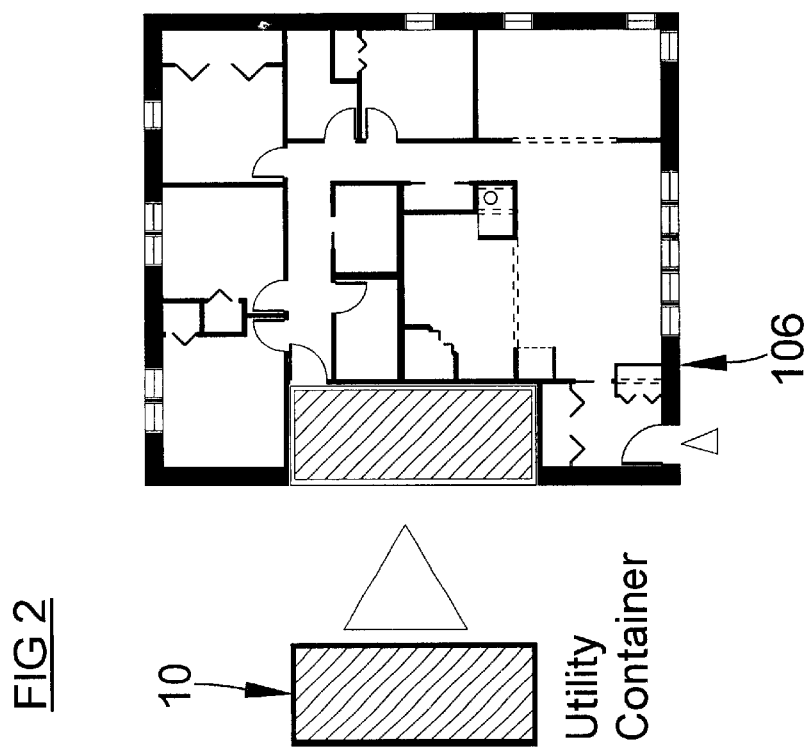
FIG. 2 shows a part sectional top view of a building including an embodiment of FIG. 1.

Additionally and conveniently furnace 88, which may be electric, gas, oil, propane or other conventional furnace, heats the dwelling or other building, an internal (double walled) or external oil tank or external propane tank is provided when needed. Where the furnace is elsewhere in the building, a minor heating device is provided to prevent the system freezing, except in climates where freezing is impossible. Associated with furnace 88 is HRV or ERV 90, included necessary ductwork, additionally conventional air conditioning devices may be associated with or built into furnace 88. Zone control valves 92 for a hydropic heating system associated with furnace 88 may be conveniently wall mounted within container 10. Although electricity may be supplied by solar (photovoltaic), storage battery, grid system or local generator, a storage battery bank 94 and a control panel 96 for a photovoltaic solar system are also conveniently provided. An integrated monitoring system for the water recycling system may be present with remote dial-up control equipment 98. Also thermostat control 100, generator 102 and a sprinkler system 104, fed from the grey water supply are typically present. When oil tank 110 is required, which must be double walled, it is behind hot potable water tank 50 and solar hot water-heat exchanger tank 52, with external access through the container wall. Structural support wall 54 acts as a firewall. FIGS. 2 and 3 show how container 10 may be located with respect to dwellings 106 and 108.

Both septic tank 64 and internal cistern 30 are secured in foam(ed) material which may be plastic in the base of container 10.

Currently Waterloo Biofilters™ contemplated as a possible biofilter 70 remove solids including *E. coli*, other bacteria, amoebae, etc., to 99.9999% efficiency. At present it is known that for Waterloo Biolfilteri the wastewater must percolate through 4 feet (1 ¼ meters) to be cleansed effectively, greater depth doesn't add efficiency, lesser doesn't work as well. Two passes each of 2 feet depth were considered, but it was found that a single pass of 4 feet was necessary. Current Waterloo Biofilters™ have circular tanks and wastewater is sprayed from a nozzle. Other biofiltering media are available using the circular or square tanks, and as those skilled in the art are aware, such media having the same effect may be used for the same purpose instead.

Sand/charcoal filters and Waterloo Biofilters™ tend to plug eventually, when water ceases to flow through them they are replaced. This is a self monitoring safety feature, because contaminants cannot pass through the grey water system. Biofilters may be cleaned instead. Backwash mechanisms to clean sand/charcoal filters are known and will be usually incorporated in the systems.

When the internal components are installed, they are connected by connecting tubes or hoses. These connections are preferably flexible, cross-linked polyethylene tubing, (e.g Wirsbo AquaPEX (™) type). The filters, pumps, and other equipment, such as switches are mounted on slidable shelves, in slidable drawers or on slidable carriages, or hingeably mounted on walls, or slidable shelves, drawers and carriages for easy access, maintenance and repair. The assembled components are tested under controlled environmental conditions, before shipping to the construction site, where it will typically be placed on a slab-on-grade or reinforced floor structure, and suitably connected to building input and output connections.

As septic tank 64 may require removal or replacement, a section of wall adjacent septic tank 64 is removable to allow this, being attached by bolts for example. Septic tank cleanout 66 will generally have an access hatch in the adjacent container wall.

As a safety feature a sprinkler system pressurized from grey water storage tank 82 is present mounted in the roof/ceiling of container 10. As noted the preferred building heating system is hydronic (circulated heated water or steam).

The container allows the substantial advantage of mass production of a specialized and standardized prefabricated unit to service any type of building, which can be tested before installation. The combination of preassembled mechanical components within the container allows the substantial advantage of uniformity of standard components. Further the container together with its mechanical elements form a singular, new, distinct, prefabricated element with a different identity from the previous multitude of separate elements, separately installed and maintained, strewn around a building. The standard container although structurally integrated into the dwelling, retains its integrity because it's physically separate and can be removed and replaced or moved as needed. The individual mechanical components are permanently installed in the container and can be serviced in it. The container and its components can be monitored from remote location(s) and using exact installation diagrams and descriptions troubleshooting, repair and maintenance will be simplified and standardized. This is especially important in remote locations, where the cost of skilled or qualified labour is prohibitive, and semi-skilled local labour may be used instead (for instance community handyman rather than fly-in plumbing contractor).

The components and systems described herein are those currently commercially available at economic costs and prices. As those skilled in the art are aware, other components and systems of similar functions and effects can be substituted therefor, provided they are commercially available at economic costs and prices. Conventional heating devices, ERV, HRV, air conditioning, solar, grid, or generator electricity supply are commercially available and may be built into the system.

Figure 10:
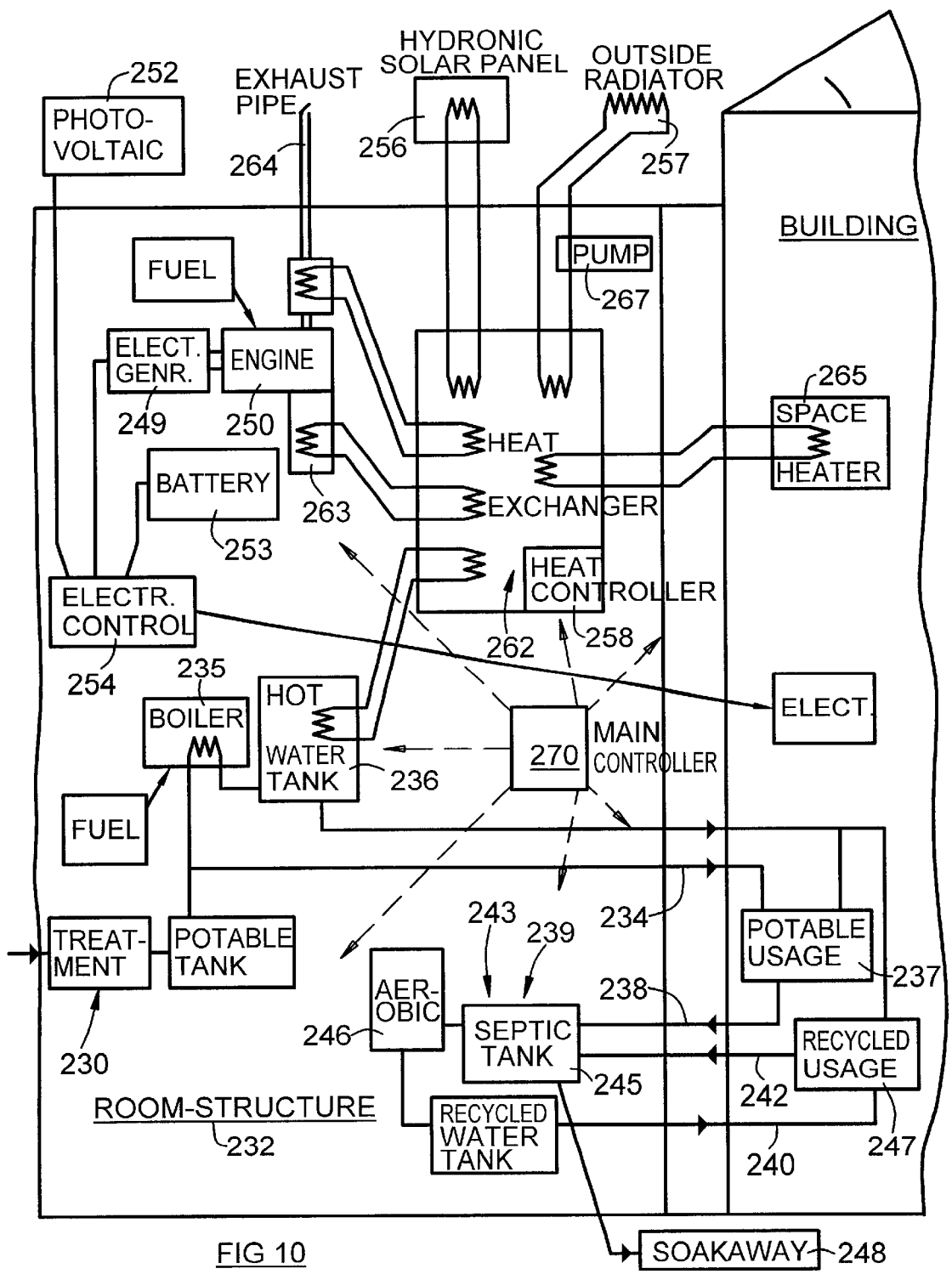
FIG. 10 is a diagram that shows how some of the utilities are arranged within the room-structure of the apparatus (module)
Figure 11:
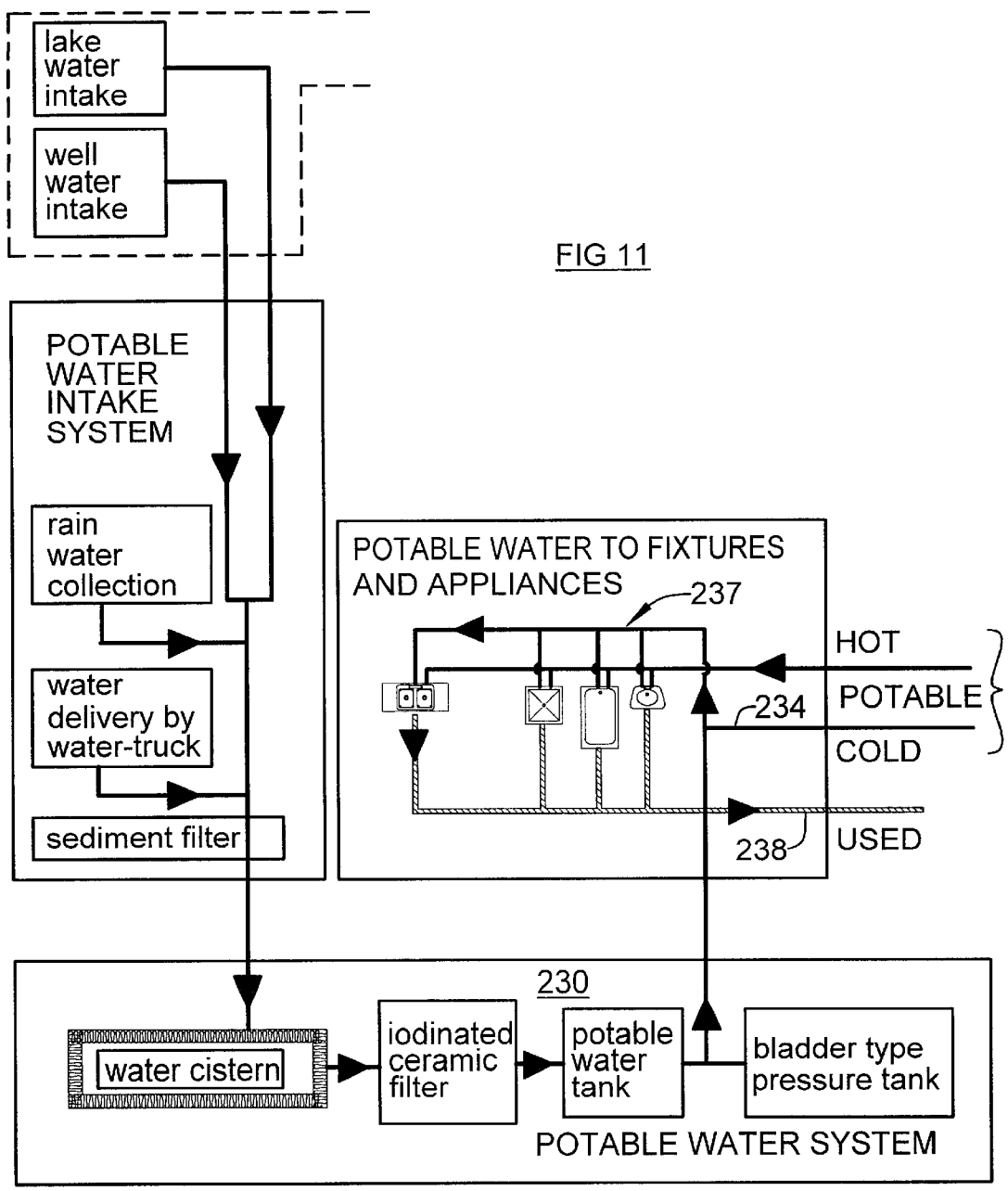
FIG. 11 is a block diagram showing some aspects of the potable water supply system of the said module.
Figure 12:
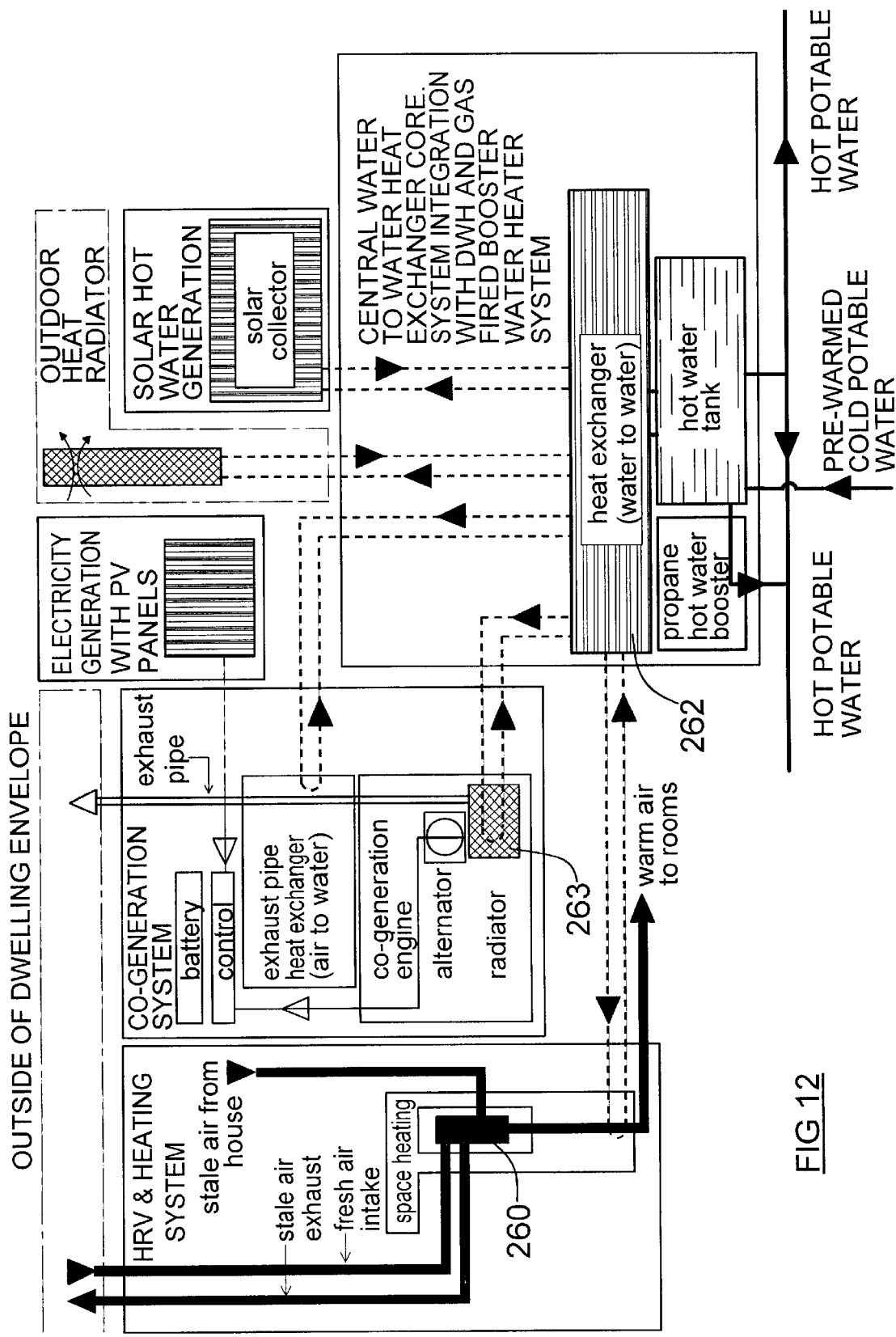
FIG. 12 is a block diagram showing some aspects of the hot water supply and space heating supply systems of the module, and the manner in which those systems integrate with the electricity generation systems of the module.
Figure 13:
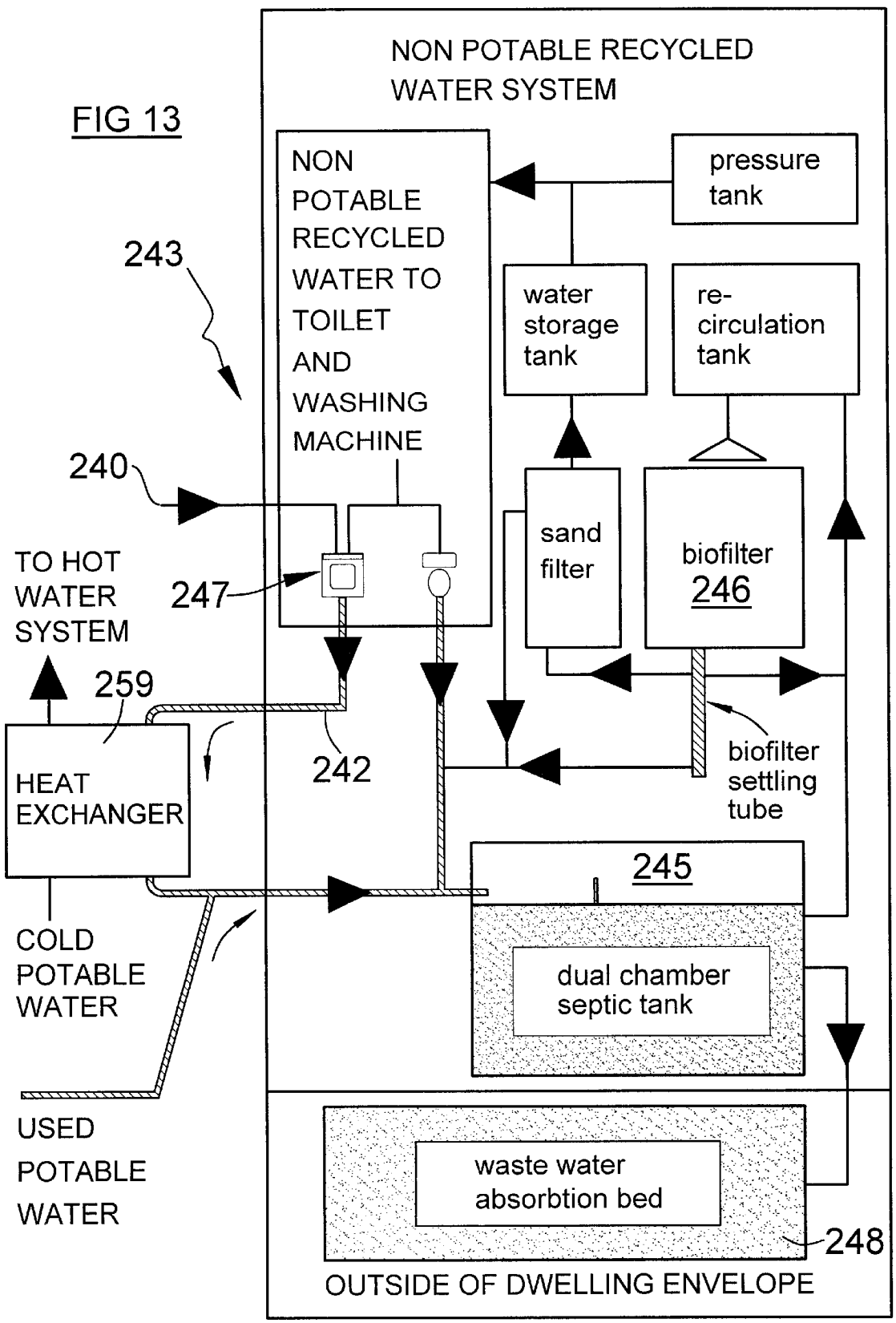
FIG. 13 is a block diagram showing some aspects of the used water recycling system and the wastewater treatment system of the module.

In FIG. 10, the components 230 for rendering the incoming water potable are contained within the room-structure 232. A port 234 in the wall of the room-structure transfers potable water to the building. Hot water for the building is derived by diverting some of the potable water through a boiler 235, and into a hot water storage tank 236.

The hot and cold potable water is used in the building in such things as sinks, bath, shower, drinking water, etc, as indicated at 237.

The effluent or used potable water is collected, and fed back into the room-structure 232 via port 238. The used water passes through a water recycling plant 239. From there, the recycled water is fed once again to the building, through port 240, where it is used for such purposes as toilet flushing, washing machine, etc. If the recycled water is not hot enough for the intended purpose, it is preferred not to heat the recycled water, as such, but to take the hot water again from the hot potable water supply.

Effluent water from the toilet flushing and washing machine is conveyed back to the room-structure, through port 242, where it is fed into a wastewater treatment plant 243. This plant includes a septic tank 245. In the septic tank, the water remains stationary for a period of time. The period is long enough that solid materials in the water can settle out. Denser solids sink to the bottom of the water in the septic tank, and lighter solids float to the surface: in a well set-up septic tank, the body of water becomes substantially clear of solids. In the septic tank, the anaerobic conditions in the water, and the length of time such conditions are maintained, means that the micro-biological reactions can take place which reduce (i.e digest) organic materials dissolved or suspended in the water. The period of time the water spends in the septic tank is long enough that the water leaves the septic tank substantially clear of solids, and substantially clear of dissolved organic material.

The water from the septic tank contains dissolved ammonium, and the water must be aerated to oxidise the ammonium. This is done by passing the water from the septic tank 245 into an aerator 246 (which is a Waterloo Biofilter). Here, the water is sprinkled onto a heap of cubes of spongy foam material. The sponge cubes keep the water held up in the air for a considerable time period, during which the aeration reactions can take place. Complete nitrification of the ammonium can usually be accomplished in one pass through a Waterloo Biofilter, but it can be arranged for the water to pass through the aerator more than once, if need be.

The treated wastewater is recycled again, through the toilet, washing machine, etc 247. In fact, it is possible to clean the water in the wastewater treatment plant to potable (drinking) standards, if desired, whereby the recycled water can be used for the sinks, bath, showers, etc. Using the recycled water only in the non-potable uses, however, generally finds more favour with the building occupants.

If the septic tank becomes too full, the excess water is drained off, and is allowed to soak away, as at 248.

It will be noted that the used potable water from the sink, bath, shower, etc 237 is fed through the septic tank, along with the wastewater from the toilet and washing machine 247, even though the quantity of solids and organics in the used water from those potable systems is quite low. In fact, the presence of the sink-bath-shower water serves to enhance the performance of the septic tank, i.e serves to promote the reactions which will break down the organic solids from the toilet. Also, the sink-bath-shower water itself contains pollutants, in the form of skin debris for example, which benefit as to their rate of breakdown from the ammonia present in, and from the anaerobic digestion reactions that are promoted by, a septic tank. Thus, combining the used potable water recycling treatment with the toilet wastewater treatment can benefit both.

Electricity for the building comes from a number of sources in and on the room-structure. These include a generator 249 driven by a diesel engine 250, photo-voltaic cells 252, possibly a windmill, batteries 253, and the like. A fuel cell may be used instead, or a micro-hydro-electric generator, or even a nuclear generator.

The energy requirements in summer are often not demanding. Enough heat and electricity can be provided by running the engine 250 and generator 249 for 15 minutes, every other day. In fact, the engine should be run that often anyway, to prevent deterioration due to standing idle. An electrical controller 254 controls the different electrical sources, batteries, load monitoring, etc.

Hot water is provided by co-generation. There is plenty of heat available, in the coolant of the engine 250, and from the exhaust pipe of the engine, to heat the hot water, even at 15 minutes every other day, in conjunction with solar panels 256.

In winter, electricity and heating are both at a maximum when the engine is running. It can be expected that running the engine twice a day, for 30 minutes each time, early morning and at evening-meal time, will provide enough heat and electricity for those peak times, and to provide enough stored energy to carry through the rest of the time.

It may be noted that the heat from the engine twice a day not only heats the hot water, but keeps the room-structure 232 warm enough for the septic tank to maintain itself micro-biologically (whereas a septic tank located outside in very cold weather might cease reacting, even if it did not freeze up). Often, the problem with the system as described is to keep the interior of the room-structure from overheating, rather than to provide enough heat, even in winter. An excess-heat-shedding radiator 257 is located on the roof of the room-structure.

The co-generation system sometimes operates primarily to generate electricity, the heating then being a by-product, and sometimes primarily to generate heat, the electricity then being a by-product. It is recognised that in the designs as described herein any imbalance between the two, as measured at the co-generation system, will usually be quite small.

The system makes full use of heat exchangers. Heat is available from various circulating fluids, at various temperatures, and heat is required again at various temperatures. The heat exchanger controller 258 controls the circulation of fluid to promote the most efficient use of the heat available, commensurate with the requirement of the heat load. The different temperatures as are needed can be accommodated in physically separate heat exchanger cores 259,260,262, as shown. Alternatively, one heat exchanger core might be sufficiently stratified as to temperature separated layers as to accommodate the various temperature requirements.

Figure 14:
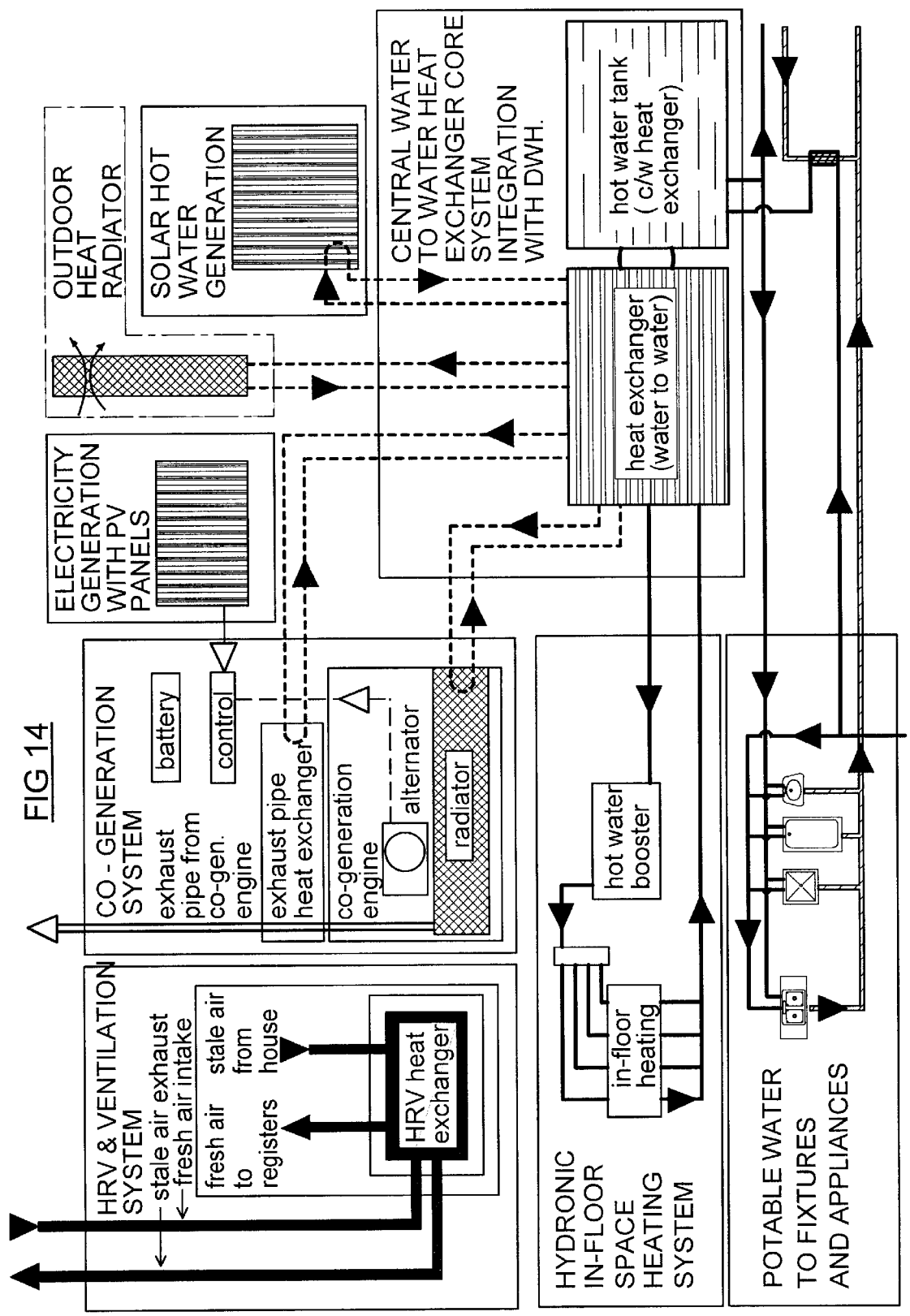
FIG. 14 is a diagram like FIG. 12 of a variation of the systems shown in FIG. 12.

In the heat exchanger 259, heat from the returning waste water and used water, which can be quite warm, is used to pre-heat cold potable water before that water enters the boiler. In the heat exchanger 260, heat is transferred from outgoing stale (warm) air to incoming cold air from outside. In the main heat exchanger 262, heat is transferred from the engine's coolant 263 and exhaust pipe 264, solar collector panel 256, and with the hot water tank 236 and the space heating system 265. In FIG. 14, the heat exchanger is arranged a little differently, with heat exchange also to the air in a forced-air heating and ventilation system.

The controller 258 can be used to activate pumps 267 (only one is shown, but pumps are fitted to each of the circulation systems) to circulate the various fluids, as required for maximum efficiency. Also, valves can be provided to divert fluid flows from one area to another, if desired.

It should be noted that although FIGS. 11–14 show the various circuits as being separated, of course this is just for convenience of illustration. As mentioned herein, much of the advantageous significance of the apparatus as described lies in the fact that the equipment and systems are coordinated together. As mentioned, the equipment and systems are not only physically integrated, i.e structured into the room-structure, but are functionally and operationally integrated. The central or main controller 270 (FIG. 10) monitors and coordinates the interaction of the various systems.

The walls of the room-structure 232 are well insulated thermally (and of course the building itself should have good insulation). The enclosed thermally insulated room-structure can be expected incidentally to have good sound insulation, also. The intention is that people should not go into the room-structure in winter, because leaving the door open in sub-zero conditions might cause serious damage. Similarly, the engine should not be allowed to stand cold, and should be started periodically even when no-one is occupying the building. The resulting background heat keeps the septic tank and aerator etc functioning.

Of course, access might be required for servicing and to fit replacement parts. In this connection, it should be noted that the components used in the module can be standardised, or at least they can be recorded. The module was built in a factory, and so it is an easy matter to keep records as to the type, size, brand, etc of components. The system can be geared to the special needs of servicing by phone; or at least so the serviceman knows what type of replacement pump to bring, which is important when he has to come long distances).

It has been emphasized that the module enables the whole utility apparatus to be structurally integrated into the room-structure. It should be noted that an exception to this desideratum usually will be the batteries. The batteries should be removed form the room-structure for transport. The batteries are very heavy, and their presence would affect the balance of the module when the module is being hoisted on a crane. The battery pack can be hoisted separately. Batteries are of course easy to connect, so separation poses no problems.

The designs as described are aimed at promoting the combining of resource conservation with mechanical system integration to enhance overall energy efficiency.

The solar water system and the electrical system can be combined to support the space heating system, and the hot water heating system. The heat inside the thermally insulated module enhances the performance of the septic tank and other water treatment systems. Residual heat from the septic tank is not wasted, but keeps the container contents from freezing even in the coldest climate. Often, there need be no specific separate heating components, and a combination of residual heat gain, combined with efficient co-generation allows for a 90% utilization of fuel. Central ventilation can also be integrated and in fact can substitute a conventional heating system.

The same integration is applicable to the potable water system and the grey water re-circulation. The designs contain mechanical systems similar to municipal water plants, but on a micro scale. They are aimed at offering safe, reliable, well proven technology, but specifically tailored to stand-alone housing units.

The designs make integration feasible using existing "off the shelf" technology. Most components utilized in the designs as described are readily available proprietary units.

The module as described contains a number of distinct mechanical systems, plus a monitoring system. The design allows for remote troubleshooting and servicing. Each of the mechanical systems can operate on a stand-alone basis but the system integration allows for a greatly enhanced efficiency.

Although the described system is focused on a single family residential application, non-residential applications (remote airport buildings, mining camps, etc) can benefit from the invention.

The generation of potable water is site specific. The described designs allow for a variety of possibilities, including lake water, well water, trucked water and rain water collection.

The purification and maintenance of potable water, safe for human consumption, is the a function of the mechanical components which make up the potable water system. Incoming water is initially stored in an insulated cistern (located in the subfloor of the unit). Assuming a potable water consumption of 28 gallons per person per day (140 gallons per five person family) the storage capacity of the cistern will be approximately five to six days. The modular concept of the design allows the storage capacity to be increased, as required. Maximum storage capacity is 2000 gallons.

A multi-stage iodinated resin filter system provides water purification. As water containing micro-organisms (pathogenic viruses, bacteria and parasites) passes through a bed of resin, iodine molecules are released and de-activate or kill these organisms. In addition to the iodinated resin filters ceramic filters are integrated and the entire system can easily be modified to accept additional special filters allowing for removal of site-specific impurities in the water.

A potable water storage tank and conventional pressure system complement the potable water system. In-house plumbing is conventional but water saving features are integrated.

The sizing of the potable water system relies on the principle of resource conservation. Restrictions placed on the occupants of the building by the manner of presenting the utilities are hardly noticeable. The integrated use of water saving appliances allow for a considerable reduction of potable water consumption.

The non-potable recycled water system is designed to support the potable water system. The application of water conserving measures reduces the potable water consumption, but the re-cycling and re-use of water will greatly enhance the overall efficiency of the entire system.

The potable water used for cooking, dishwashing, bathing and shower is collected and treated in a special modified septic tank that acts as a primary treatment facility. A secondary treatment is provided by a biofilter. The tertiary treatment (similar to the potable water system) is provided by a sequential multi-media polishing system.

Non-potable recycled water preferably is only be re-used for the washing machine and toilet. Preferably, the system is so arranged that recycled water cannot be in contact with the primary potable water system.

The water-to-water heat exchanger core is a good example of what can result from the multi-purpose integration of the various utility functions.

The central water-to-water heat exchanger facility is the core of the heat generation and storage process. Beside providing heat for domestic hot water, this core supplies heat for the water-based space-heating requirements. Extraction of residual heat from wastewater, generation of heat from a solar hot-water collection system and extraction of residual heat from the exhaust of the cogeneration system are combined with either a propane fired tankless on-demand hot water booster heater or hot water generation from a co-generation system.

Previously, it has not been worthwhile to provide such all-encompassing heat exchanging as is shown in the described designs. Heat exchangers generally do not have so many circuits and supplies and versatility, whereby the described multi-port water-to-water heat probably will not be available proprietarily, but will need to be custom-designed.

A conventional solar hot water generation system is tied into the central water-to-water heat exchanger and water storage core. The solar heat exchanger panels are mounted in a conventional way either on the roof of the module, or on the roof of the building to be serviced by the module.

The space heating system can either be a hydronic in-floor space heating system or a combined HRV/airhandler forced-air space heating system. Both systems rely on the central water-to-water heat exchanger and storage core to provide the main space-heating energy input requirements. Additional heat will be generated by either a propane-fired tankless on-demand hot water heater or the diesel-fired co-generation system. Mechanical components required for the space- heating systems are readily available and only require minor customization work.

To reduce the space-heating requirements and enhance overall system efficiency, it is preferred to incorporate super-insulated, R 2000 or similarly enhanced construction methods to the serviced building.

The module can have a factory-installed, integrated ventilation system. If forced-air space-heating is required, the HRV/air handler ventilation system simultaneously serves as the heating system. A water-to-air heat exchanger integrated into the ventilation system, supplied by hot water from the central water exchanger core, provides the required heat input.

Occasionally, the invention might be considered an economical option, even when there is mains electricity available. But the designs as described enable dwellings and other buildings to operate "unplugged" from a utility grid. Preferred electricity generation will be by means of photovoltaic cells, wind power, micro-hydro-electric generation systems, and the like, such as are available. Batteries provide electrical storage, and integrated physically into the container.

These proposed systems, in themselves, can be considered conventional and are readily available to be customized to particular site applications.

The integration of a stand-alone micro co-generation system into the container provides a backup for electricity generation as well as heat generation. Some of the options may be summarised as:

Micro co-generation systems based on internal combustion engine technology are commercially available.

More energy efficient Stirling engine based co-gen systems are becoming available commercially.

Fuel cell technology is developing and can be integrated into the present concept without modifications to the overall system integration structure.

All functions of the utility units and components contained in the module should be constantly monitored. Computer technology now allows for a seamless integration of remotely controlled mechanical system censoring, maintenance and troubleshooting.

The advantages of the manner of integrating the utility systems, as described herein, may be summarised as follows:

The assembled components are tested in a factory environment, under controlled conditions before shipping to the construction site.

The container allows the substantial advantage of mass production of a highly specialized but standardized prefabricated mechanical unit, to service more or less any style of building.

The use of pre-assembled mechanical components within the container allows the substantial advantage of uniformity of standard components.

The pre-fabricated container is supplied with the mechanical elements already functionally and structurally integrated inside the container; such an apparatus has a new identity, as compared with the previous multiplicity of separate elements, separately installed and maintained, strewn around a building.

The standard container, although integrated functionally into the dwelling or building, retains its physical integrity in that it is physically separate and can be removed and replaced at any time.

The individual mechanical components are permanently installed in the container and can be serviced in it, in that the designer took account of the need for service access when designing the layout of the module, and the juxtaposition of the components housed therein.

The container and its components can be monitored from remote locations; it is a simple matter to provide exact installation diagrams and descriptions, prepared at the time of manufacture, whereby troubleshooting and repair and maintenance can be simplified and standardized.

Some further advantages of the integrated combined utility module can be summarised as follows.

Because of the standardised, and known, layout of the module, the performance of the components can be monitored remotely.

Pre-fabrication of the module allows for rapid on-site installation, and minimal labour costs.

During shipment, the mechanical components are protected from transportation damages, which prevents many of the usual delays and downtime during the actual construction process.

The rigid enclosure provides protection for mechanical components after installation, and acts as a fire and spill containment barrier.

The fire risk to the serviced building also is much reduced, given that the utilities are housed in a separate module (fire being an especial danger in inaccessible areas).

Access to the mechanical equipment can be restricted to authorized personnel.

Following decommissioning of the (non-residential) building, the mechanical container can be removed without damage to the equipment and can be employed in another location. This portability of the utilities infrastructure can allow for the equipment to be leased rather than purchased.

In the case of e.g a mining camp, the environmental impact to the camp site location will be lessened; permanent installations (such as a septic system are not required, and an environmentally-uncontaminated site is left behind when the camp is moved.

The module can be built in such a way that maintenance can be done by the homeowner. The module may be provided with a comprehensive troubleshooting and servicing guide, which will allow the owner/occupant to perform minor servicing and maintenance tasks.

The module may be equipped with remote monitor and sensor devices, whereby locating and identifying problems is simplified. Factory production of the unit allows for a uniform design, which simplifies troubleshooting.

Even though the module is prefabricated, to the extent that assembly and installation work at the site is almost eliminated, it can be arranged that the components in the module can be changed or upgraded. For example, fuel-cell technology might progress to the point where it would be economical to replace the diesel-generator, and the module can be designed to accommodate that possibility.

Also, for example, the engine that drives the generator might be the engine of a vehicle. The designer should design the module so that the vehicle's engine can be utilised in that way. Alternatively, the designer might provide that the module contains a battery charging facility for an electric vehicle.

The module offers standard structural, mechanical and monitoring platform allowing seamless integration of existing equipment. The designer can also provide that additional novel or improved technologies can be integrated into the module at a future time.

The module design provides non-structural, modular integration of the unit into a dwelling or other building. The preferred connection point between the module and the building is a perpendicular "plumbing wall" directly abutting the module structure.

In case of modular, prefabricated housing units, this plumbing wall could be considered part of the module package, to facilitate easier installation procedures (and to eliminate complex dwelling/container connection detailing).

In conventionally constructed frame-housing, a prefabricated plumbing wall of course provides a constraint on the architect, but this is more than compensated for (at least economically) in that the need for at least one specialized trade (plumber) is eliminated.

One possible use of the integrated module of the invention is in the area of private subdivision development. It is much more economical for a developer to build several houses at a time, rather than one by one. However, the capital tied up in building houses prior to sale can be a problem. With the invention, several houses can be built together, ahead of sale, but the utilities module can be added later, when the house is finally sold. The release of capital can be very worthwhile.

The following tables identify some of the components that have been found to be suitable for use in the designs as described herein. The types, sizes, etc of the items are in respect of a particular residential application, and final decisions on components might be different in other cases, with different system requirements. For example, some of the indicated equipment would not be suitable for a mining camp; larger engines such as Cumnmins (™) or Oman (™) would be more likely to be selected, in that case.

Description of mechanical components, parts and systems contained in the
Combined Mechanical Utility Container
☐ The numbers in the left column refer to the schematic drawing on the previous page (FIG. 1)
☐ In some cases various system options are indicated. The option in bold lettering is the preferred system for the initial prototype development.

STRUCTURAL COMPONENTS

| | | |
|---|---|---|
| 10 | modular container structure (outside measurements) 8' × 8' × 14' minimum to 8' × 8' × 20' maximum | Load-bearing (tubular) steel frame construction, exterior and interior metal cladding. Most structural steel connections are welded - some are bolted to allow metal exterior panels to be removed for service access or exchange mechanical components ("drawer"-type mechanisms are integrated to move mechanical components).<br>• Container walls and roof insulated to min. R 8. - Icenene ™ foamed in wall, floor frame and roof cavities.<br>• Structural foam core panels (3" foam core, clad with metal inside and outside) New World Building Supplies, Airdrie, Alberta |
| 12 | exterior walls of container 3" thick | insulated steel frame, metal clad |
| 14 | standard exterior door (2'10" × 6'8") | polyurethane core, welded steel frame |
| 16 | load bearing container floor 3" thick | insulated steel frame, metal clad |
| 18 | load bearing subfloor | framed fibre reinforced plastic grating 1½ × 1½" (Russell Metals Inc., Winnipeg, Manitoba) |
| 20 | 12", 16" or 24" @ welded structural bends | as per structural engineering design |
| 22 | horizontal and vertical bends | |
| 24 | lower transverse support wall | framed fibre reinforced plastic grating, secured to exterior walls to increase lateral rigidity of container shell |
| 26 | corridor - full container height | size: approx 2'10" × 8' min, 13' max. |
| 54 | lateral support wall | framed fibre reinforced plastic grating 1½ × 1½" |
| 56 | lateral support wall | |
| 58 | horizontal support shelf | |
| 86 | horizontal structural support shelf | |

POTABLE WATER SYSTEM

| | | |
|---|---|---|
| 28 | 22,000 liters external underground potable water storage cistern -- optional -- | fiberglass burial tank<br>Equinox 6000 gal. 96" diameter × 22' long, --<br>Equinox Industries, Winnipeg |
| 30 | internal potable water storage cistern (min. 1700 max 4200 liters, anticipated minimum 4 to 5 day Supply) | Tank is foamed in place to reduce condensation, increase rigidity of entire structure and provide thermal insulation.<br>Equinox Industries, Winnipeg |
| 32 | conduit between internal and external cistern | 1" Wirsbo Aquapex ™ piping |
| 34 | welded opening in container wall c/w frame and seal | |
| 36 | potable water purification and treatment system sequential multimedia filter | various options are available and selection to be based on space requirement and efficiency for the particular location, occupant load of dwelling: |

-continued

Description of mechanical components, parts and systems contained in the
Combined Mechanical Utility Container
☐ The numbers in the left column refer to the schematic drawing on the previous page (FIG. 1)
☐ In some cases various system options are indicated. The option in bold lettering is the preferred system for the initial prototype development.

|    |                                                                 |                                                                                                                                   |
|----|-----------------------------------------------------------------|-----------------------------------------------------------------------------------------------------------------------------------|
|    |                                                                 | • Stuart and Miller Inc., iodinated resin filter (plus ceramic filters)<br>• Intermittently operated slow sand filtration process, Davnor Water Treatment Technologies, Calgary, Alberta |
| 40 | potable cold water storage tank                                 | conventional equipment                                                                                                            |
| 42 | filter (UV filter, ozone or ionized resin)                      | see #36 and #38                                                                                                                   |
| 44 | pressurized potable water storage tank                          | 20 Imp. Gall. bladder pressure tank                                                                                               |
| 46 | conduit connecting container water with dwelling system         | conventional equipment                                                                                                            |
| 48 | welded opening in container wall c/w frame and seal             |                                                                                                                                   |
| 50 | potable hot water storage tank                                  | conventional equipment<br>Viessmann Industries, Waterloo, Ontario                                                                 |
| 52 | solar hot water heat exchanger tank                             | HoriCell (horizontal) water storage tank with 2 integrated heat exchanger coils<br>Viessmann industries, Waterloo, Ontario        |

WASTE WATER SYSTEM

|    |                                                                 |                                                                                                                                   |
|----|-----------------------------------------------------------------|-----------------------------------------------------------------------------------------------------------------------------------|
| 60 | waste water conduit connecting dwelling and container           | conventional 3" ABS                                                                                                               |
| 62 | waste water treatment system                                    | compact unit system at present developed and marketed by Creative Communities Research, Toronto                                   |
| 64 | dual chamber septic tank                                        | custom made, plywood/fiberglass tank, dual chamber, min 900 mm high, min 3600 liter capacity, foamed in place to increase strength<br>• Equinox Industries, Winnipeg<br>• Creative Communities Research, Toronto |
| 66 | clean out for dual chamber septic tank                          | 16" diameter                                                                                                                      |
| 68 | waste water recirculation tank (approx. 1000 liters)            | Polyethylene Tank E 250 WS Equinox Ind.                                                                                           |
| 70 | biofilter (approx. 1400 liters)                                 | • Waterloo Biofilter ™ system, developed and marketed by Mr. Craig Jowett, Waterloo Biofilter, Guelph, Ont.<br>• Bio-Green ™ Deer Lake, Newfoundland<br>• Micro-Septic, Orange County, California |
| 74 | underground leech field disposal bed                            | • gravel pack or<br>• INFILTRATOR ™ septic leachfield system, marketed by Equinox Industries, Winnipeg                            |
| 72 | waste water conduit connecting container and leech field        | ABS piping                                                                                                                        |
| 76 | waste water polishing system                                    | • Stuart and Miller Inc., iodinated resin filter                                                                                  |
| 78 | sequential multimedia filter                                    |                                                                                                                                   |
| 80 | filter removing bio-organisms (ozone, UV or iodinated resin)    | • Compact unit system at present developed and marketed by Creative Communities Research, Toronto<br>see #36 and #38          |
| 82 | grey water storage tank (approx. 1250 liters)                   | Polyethylene Tank E-250 WS Equinox Ind.                                                                                           |
| 84 | secondary (grey) water conduit, connecting CMUC and dwelling    | ABS piping                                                                                                                        |

HEATING SYSTEM

|    |                                                      |                                                  |                                                                                                                                                                                                                                                                        |
|----|------------------------------------------------------|--------------------------------------------------|----------------------------------------------------------------------------------------------------------------------------------------------------------------------------------------------------------------------------------------------------------------------|
| 88 | furnace (gas, oil, diesel or propane)                | air-handler heating/ventilation system           | "Life breath" ™ clean air furnace, developed by Nutech Energy Systems (London, Ont.) combines a high efficiency Heat recovery ventilator, air handler with a hydronic heating coil water heater into one singular unit. The hot water will be supplied by a sequence of sources. |
|    |                                                      | • in floor hydronic heating system<br>• radiator based hydronic heating system | The hot water tank acts as main storage for hot water. The tank is supplied via water to water heat exchanger by<br>• solar hot water collectors<br>• waste water residual heat collection |

-continued

Description of mechanical components, parts and systems contained in the
Combined Mechanical Utility Container
☐ The numbers in the left column refer to the schematic drawing on the previous page (FIG. 1)
☐ In some cases various system options are indicated. The option in bold lettering is the preferred system for the initial prototype development.

| | | |
|---|---|---|
| | | • air to water heat exchanger from co-generation exhaust system |
| | | • water to water heat exchanger from water-cooled co-generation system |
| | | If required, an integrated booster heater will provide additional heat (Myson, direct vent, tankless gas hot water heater) |
| 90 | Heat Recovery Ventilator HRV Energy Recovery Ventilator ERV | extraction of residual heat from residential ventilation system |
| 92 | zone control valves for hydronic heating system (only in conjunction with in floor or radiator based hydronic heating system) | Wirsbo ™ system in combination with hydronic floor heating system in dwelling; quick-connect Kitec ™ piping to allow for easy installation and maintenance. |
| 100 | thermostat controls | conventional equipment |
| 110 | oil tank (double wall c/w vent and filler to outside) | |

ELECTRICAL SYSTEM

| | | |
|---|---|---|
| 94 | storage battery bank | Flooded deep cycle lead acid batteries: "Solar Surrettes" ™, marketed by Solar Solutions, Wpg. |
| 96 | photo voltaic solar system control panel (inverter, fuses) size depending on serviced building: 6 KW/h per day to 13 KW/h per day | Trace (true sine wave output) 4.0 KW power conversion center, DC power fuse Center |
| 102 | backup generator/domestic micro co-generation system | Backup generator has to work as co-generation system - supplying hot water for the HRV/air-handler or hydronic in floor heating system and simultaneously charging the battery bank if required. |
| | | ☐ Whisper Gen, Domestic Cogeneration System, Whisper Tech Ltd., New Zealand (Stirling Engine Technology) |
| | | ☐ Fischer Panda BKHW internal combustion engine, Germany |
| | | ☐ ErgoTech BHKW internal combustion engine, Germany |
| | | ☐ Apollo 4 KW Diesel Cogeneration Generator (marine application) |
| | | ☐ Lister-Petter/Kubota gen-set marketed by LOW Electric/Cummins, Kenora, Ontario |

MONITORING SYSTEM

| | | |
|---|---|---|
| 98 | Remote dial-up control equipment | various suppliers custom manufacture special control equipment: |
| | | ☐ Vansco Industries, Winnipeg |
| | | ☐ Trak Engineering, Thunder Bay |
| 104 | Smoke and heat detector | conventional equipment |

FIRE PROTECTION SYSTEM

| | | |
|---|---|---|
| | Sprinkler system | single station, conventional sprinkler system integrated into the pressurized hydronic heating system |

OPERATION AND SERVICE MANUAL

| | | |
|---|---|---|
| | CD ROM based Operation and Service Manual | CD Rom development by The Taiga Institute for Land, Culture and Economy in Kenora, Ont.. Present GIS application of software can be modified to accommodate interactive service and operation manual. |

What is claimed is:

1. A pre-fabricated utilities apparatus, for use in association with a habitable building, wherein:

the apparatus includes a room-structure, comprising walls which have the general configuration of a room;

the apparatus includes a first-utility-plant, which is located inside the room-structure;

the first-utility-plant comprises a means for processing a first-medium;

the apparatus includes a first-utility-port, which is located in one of the walls of the room-structure, for transferring the first-medium between the first-utility-plant and the building;

the apparatus includes a wastewater-treatment-plant, which is also located inside the room-structure;

the apparatus includes a wastewater-port, which is also located in one of the walls of the room-structure, for transferring wastewater from the building to the wastewater-treatment-plant;

the wastewater-treatment-plant comprises means for processing and treating wastewater conveyed from the habitable building;

the apparatus includes means for fastening the plants and ports physically in and to the room-structure;

the room-structure is physically self-supporting, to the extent that the room-structure, and the plants and ports fastened physically therein, can be bodily picked up and transported as an integrated whole unit;

the room-structure is of such size and weight that the room-structure, with the aforesaid plants and ports fastened therein, can be transported by truck as an integrated whole unit.

2. As in claim 1, wherein the apparatus includes a coordination means, for coordinating operation of the first-utility-plant and the wastewater-treatment-plant, in the sense of coordinating a product or by-product of the operation of the first-utility-plant into the operation of the wastewater-treatment-plant.

3. As in claim 1, wherein the first-utility-plant comprises a first-water-processing-plant, the first-medium comprises a body of water, and the first-utility-port comprises a water-port for transferring water in the body of water from the first-water-processing-plant and into the building.

4. As in claim 3, wherein the apparatus includes operable means for transferring the body of water, in sequence, form the first-water-processing-plant through the water-port to the building, then back from the building through the wastewater-port, then through the waste water-treatment-plant.

5. As in claim 3, wherein:
the water-processing-plant comprises a plant for providing potable water;

the water-port comprises a potable-water-exit-port, for conveying potable water out of the room-structure, and into the building;

the apparatus includes a used-potable-water-return-port, located in one of the walls of the room-structure, for returning used potable-water from the building into the room-structure;

the apparatus includes a used-potable-water-recycling-plant;

the apparatus includes a recycled-water-exit-port, for transferring treated water from the used-potable-water-recycling-plant to the building.

6. Apparatus of claim 5, wherein the apparatus includes operable means for transferring the body of water, in sequence, from the first-water-processing-plant through the water-port to the building, then through the used-potable-water-return-port to the used-potable-water-recycling-plant, then back into the building through the recycled-water-exit-port, then back from the building through the wastewater-port, then through the wastewater-treatment-plant.

7. As in claim 6, wherein the wastewater-treatment-plant includes a septic tank.

8. As in claim 1, wherein the room-structure is so structured and arranged as to be unsuitable for human habitation therein.

9. As in claim 7, wherein:
the wastewater-treatment-plant also includes an aerobic-treatment-station, which is so structured and arranged that water being treated in the wastewater-treatment-plant can remain in the aerobic-treatment-station for a long enough period that aerobic reactions for the nitrification of dissolved ammoniom present in the water are substantially completed;

the wastewater-treatment-plant includes means for conveying water being treated in the plant through the septic tank and then through the aerobic-treatment-station, in sequence.

10. As in claim 7, wherein:
the walls of the room-structure include a floor, a roof, and four side-walls;

the walls are so arranged that the room-structure, when installed in operational association with a building, is substantially enclosed;

the room-structure includes a false-floor;

the false-floor lies in the room-structure above the floor, thereby creating a space of height h between the floor and the false-floor;

the septic tank is of a smaller height than the height h, and the septic tank lies in the space of height h between the floor and the false-floor;

the septic tank is structurally integrated into the room-structure, whereby the presence of the septic tank between the floor and the false-floor, within the space of height h, serves to enhance the structural strength and rigidity of the room-structure.

11. As in claim 10, wherein:
the apparatus includes a potable-water-storage tank, which is arranged in the apparatus for the storage of potable water;

the potable-water-storage tank is of a smaller height than the height h, and the potable-water-storage tank lies in the space of height h between the floor and the false-floor;

the potable-water-storage tank is structurally integrated into the room-structure, whereby the presence of the potable-water-storage tank between the floor and the false-floor, within the space of height h, serves to enhance the structural strength and rigidity of the room-structure.

12. As in claim 1, wherein the room-structure includes means for physically linking the room-structure into the habitable building, as a structural component thereof.

13. As in claim 1, wherein the room-structure is independent structurally from the building, and can be removed from the building, substantially intact, with the aforesaid plants still secured inside, and can be transported away from the building for re-use elsewhere.

14. As in claim 13, wherein:
the apparatus includes a battery pack, which, during operation of the apparatus, is located inside the room-structure, but which is detachable from the room-structure for transport purposes;

apart from the said battery pack, all structural items present in the room-structure are able to be physically secured and fastened into the room structure during transport.

15. As in claim 1, wherein the walls of the room-structure are thermally well insulated.

16. As in claim 3, wherein the first-utility-plant comprises an operable electricity-supply-means the first-medium comprises electricity, and the first-utility-port comprises an electrical wire connection between the electricity-supply-means and the building.

17. As in claim 16, wherein:

the electricity-supply-means includes a plurality of electricity sources, and includes a storage battery;

the electricity-supply-means includes a means for receiving the supply of electricity from each of the said sources, the apparatus includes an electricity-control-unit, for assessing the respective contribution of each source, for monitoring and meeting load requirements of the building, and for charging the storage battery.

18. As in claim 17, wherein one of the electricity sources is a photo-voltaic panel, which is secured to one of the walls of the room-structure, outside of the room-structure.

19. As in claim 1, wherein:

the apparatus contains an operable space-heating-unit, which is located inside the room-structure, and which is effective, when operated, to heat a space-heating-fluid;

the apparatus includes a space-heating-fluid-exit-port, located in one of the walls of the room-structure, for conveying the space-heating-fluid out of the room-structure, and into the building.

20. As in claim 1, wherein:

the apparatus includes a supply of potable water, which is located inside the room-structure;

the apparatus includes an operable hot-water-plant, which is located inside the room-structure, and which is effective, when operated, to heat a portion of the potable water;

the hot-water-plant includes a hot-water-tank, for the storage of the heated potable water;

the apparatus includes a hot-water-exit-port, located in one of the walls of the room-structure, for conveying the heated potable water out of the room-structure, and into the building.

21. As in claim 16, wherein:

the electricity-supply-means, in operation therof, produces heat;

the apparatus includes a co-generation-facility, which is located inside the room-structure;

the co-generation-facility is operatively associated with the electricity-supply-means, and utilises the heat produced by the electricity-supply-means to heat a co-generation-fluid;

the apparatus includes a means for utilising the heat thus transferred to the co-generation-fluid, in the building;

and the said means for utilising the heat is located inside the room-structure.

22. As in claim 21, wherein the electricity-supply-means includes an internal combustion engine, and the co-generation-facility utilises excess heat given off by the engine.

23. As in claim 21, wherein the apparatus includes a co-generation-fluid-port, located in one of the walls of the room-structure, for conveying the heated co-generation-fluid out of the room-structure, and into the building.

24. As in claim 21, wherein the means for utilising the heat transferred to the co-generation-fluid is located inside the room-structure, and is effective to heat potable water, and the apparatus includes a means for conveying the heated potable water into the building.

25. As in claim 21, wherein the means for utilising the heat transferred to the co-generation-fluid is located inside the room-structure, and is effective to provide space heating in the building.

26. As in claim 1, wherein:

the apparatus includes a heat exchanger system, which includes a first-heat-exchanger, having an operating temperature of TE1;

the apparatus includes at least one hot component and at least one cold component in respect of the first-heat-exchanger; the hot component being a component the operation of which would not be adversely affected or would be enhanced upon its temperature being lowered towards TE1; and the cold component being a component the operation of which would not be adversely affected or would be enhanced upon its temperature being raised towards TE1;

the first-heat-exchanger is so arranged as to enable the transference of heat from the hot component therof to the cold component thereof.

27. As in claim 26, wherein:

the apparatus includes an internal combustion engine, which is located inside the room-structure;

the hot component is coolant fluid of the internal combustion engine;

the apparatus includes a hot-water-storage-tank, which is located inside the room-structure;

and the cold component is the hot-water-storage-tank.

28. As in claim 27, wherein the apparatus includes a top-up heater for heating water in the hot-water-storage-tank.

29. As in claim 26, wherein the hot component is hot fluid from a solar panel.

30. As in claim 26, wherein:

the heat exchanger system also includes a second-heat-exchanger, having an operating temperature of TE2;

the apparatus includes at least one hot component and at least one cold component in respect of the second-heat exchanger; the hot component being a component the operation of which would not be adversely affected or would be enhanced upon its temperature being lowered towards TE2; and the cold component being a component the operation of which would not be adversely affected or would be enhanced upon its temperature being raised towards TE2;

the second-heat-exchanger is so arranged as to enable the transference of heat from the hot component thereof to the cold component thereof.

31. As in claim 1, wherein the room-structure comprises a standard-cargo-container, and the plants and ports are fastened physically into the structure of the standard-cargo-container.

32. As in claim 31, wherein the standard-cargo-container has dimensions of 20 ft by 8 ft by 8 ft.

33. As in claim 31, wherein the standard-cargo-container has dimensions of 20 ft by 8 ft by 8 ft.

34. A pre-fabricated utilities apparatus, for use in association with a building, wherein the apparatus includes:

a room-structure, comprising walls which have the general configuration of a room;

a potable-water-unit, which is located inside the room-structure;

a potable-water-port, which is located in one of the walls of the room-structure, for transferring potable water from the supply of potable water to the building;

a water-heater-unit, which is located inside the room-structure, for heating a portion of the potable water;

a hot-potable-water-port, which is located in one of the walls of the room-structure, for transferring heated potable water from the water-heater-unit to the building;

a used-potable-water-recycling-unit, which is located inside the room-structure;

a used-potable-water-return-port, which is located in one of the walls of the room-structure, for transferring used potable water from the building to the used-potable-water-recycling-unit;

a recycled-water-port, which is located in one of the walls of the room-structure, for transferring recycled water from the used-potable-water-recycling-unit to the building;

a wastewater-treatment-unit, which is located inside the room-structure;

a wastewater-return-port, which is located in one of the walls of the room-structure, for returning wastewater (sewage) from the building into the wastewater-treatment-unit;

a space-heater-unit, which is located inside the room-structure, for heating a space-heater-fluid;

a space-heater-fluid-port, which is located in one of the walls of the room-structure, for transferring heated space-heater-fluid from the space-heater-unit into the building;

an operable electricity-supply-unit, which is located inside the room-structure, and which gives off heat when operated;

an electricity port, which is located in one of the walls of the room-structure, for transferring electricity from the electricity-supply-unit into the building;

a co-generation plant, which is located inside the room-structure, and which includes a heat-transfer-medium, and the co-generation-plant is so arranged that the heat given off by the electricity-supply-means is effective to heat the heat-transfer-medium, which is effective in supply heat to one of the hot-water-heater-or the space-heater-unit; and wherein:

the walls of the room-structure are well insulated thermally;

the apparatus includes means for fastening the said units and ports physically in and to the room-structure;

the room-structure is physically self-supporting, to the extent that the room-structure, and the units and ports fastened physically therein, can be bodily picked up and transported as an integrated whole unit;

the room-structure is of such size and weight that the room-structure, with the said units and ports fastened therein, can be transported by truck as an integrated whole unit.

35. As in claim 34, wherein the apparatus includes a monitoring and control means, which is so arranged as to allow monitoring and control of some of the components of the apparatus from a remote location.

36. A pre-fabricated utilities apparatus, for use in association with a habitable building, wherein:

the apparatus includes a room-structure, comprising walls which have the general configuration of a room;

the apparatus includes a first-utility-plant, which is located inside the room-structure;

the first-utility-plant comprises a means for processing a first-medium;

the apparatus includes a first-utility-port, which is located in one of the walls of the room-structure, for transferring the first-medium between the first-utility-plant and the building;

the apparatus includes means for fastening the plant and port physically in and to the room-structure;

the room-structure is physically self-supporting, to the extent that the room-structure, and the plants and ports fastened physically therein, can be bodily picked up and transported as an integrated whole unit;

the room-structure is of such size and weight that the room-structure, with the aforesaid plants and ports fastened therein, can be transported by truck as an integrated whole unit;

the walls of the room-structure include a floor, a roof, and four side-walls;

the walls are so arranged that the room-structure, when installed in operational association with a building, is substantially enclosed;

the room-structure includes a false-floor;

the false-floor lies in the room-structure above the floor, therby creating a space of height h between the floor and the false-floor;

the apparatus includes a water tank;

the water tank is of a smaller height than the height h, and the water tank lies in the space of height h between the floor and the false-floor;

the water tank is structurally integrated into the room-structure, whereby the presence of the water tank between the floor and the false-floor, within the space of height h, serves to enhance the structural strength and rigidity of the room-structure.

37. As in claim 36, wherein:

the water tank does not completely fill the space of height h;

a portion of the space not filled by the water tank contains foam;

the foam is of such consistency that the foam, so placed, serves to enhance the structural strength and rigidity of the room-structure.

38. As in claim 36, wherein the water tank is a septic tank.

39. As in claim 36, wherein the water tank is a potable-water tank.

40. As in claim 36, wherein the space of height h contains both a septic tank and a potable-water tank.

* * * * *

UNITED STATES PATENT AND TRADEMARK OFFICE
CERTIFICATE OF CORRECTION

PATENT NO. : 6,393,775 B1
DATED : May 28, 2002
INVENTOR(S) : Staschik, Udo Ingmar It is certified that error appears in the above-identified patent and that said Letters Patent is hereby corrected as shown below:

<u>Column 26,</u>
Lines 48-60, Claim 32 should read as follows:

Claim 32. As in Claim 1, wherein:

the apparatus includes thermal donors and thermal users;

the apparatus includes a controller for coordinating thermal donors and users of the apparatus, the controller being effective to monitor total heat requirements of the apparatus, to monitor the temperatures at which heat is required by the thermal users, and to monitor the temperatures at which heat is available from the thermal donors;

the controller is effective to maximise the efficiency of utilisation of the thermal donors in relation to the thermal users, to ensure a minimum usage of fuel;

the apparatus includes an operable means for shedding excess heat from within the room-structure to outside of the room-structure;

the controller is effective to ensure that heat from the thermal donors is too much to be utilised internally within the room-structure, by all the thermal users, before operating the means for shedding excess heat.

Signed and Sealed this

Fourth Day of May, 2004

JON W. DUDAS
*Acting Director of the United States Patent and Trademark Office*